United States Patent
Kim et al.

(10) Patent No.: US 10,880,052 B2
(45) Date of Patent: *Dec. 29, 2020

(54) METHOD AND APPARATUS FOR CONTROLLING POWER HEADROOM REPORT AND HYBRID AUTOMATIC RETRANSMISSION IN MOBILE COMMUNICATION SYSTEM

(71) Applicant: Samsung Electronics Co., Ltd., Suwon-si (KR)

(72) Inventors: Wooseong Kim, Gwacheon-si (KR); Soenghun Kim, Suwon-si (KR); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,216

(22) Filed: Jun. 17, 2019

(65) Prior Publication Data
US 2019/0305893 A1    Oct. 3, 2019

Related U.S. Application Data

(63) Continuation of application No. 15/036,652, filed as application No. PCT/KR2014/010924 on Nov. 13, 2014, now Pat. No. 10,326,562.

(30) Foreign Application Priority Data

Nov. 13, 2013 (KR) .................. 10-2013-0137672
Mar. 20, 2014 (KR) .................. 10-2014-0032849

(51) Int. Cl.
*H04L 1/18* (2006.01)
*H04W 52/36* (2009.01)
(Continued)

(52) U.S. Cl.
CPC ............ *H04L 1/188* (2013.01); *H04L 1/1812* (2013.01); *H04L 5/0053* (2013.01);
(Continued)

(58) Field of Classification Search
CPC ......... H04L 1/188; H04L 1/1812; H04L 5/14; H04L 1/1864; H04L 1/1896;
(Continued)

(56) References Cited

U.S. PATENT DOCUMENTS 10,326,562 B2 * 6/2019 Kim ..................... H04W 24/08
2012/0044882 A1   2/2012 Kim et al.
(Continued)

FOREIGN PATENT DOCUMENTS

CN          103069870 A      4/2013
CN          103283166 A      9/2013
(Continued)

OTHER PUBLICATIONS

Huawei et al., PHR Considerations on TDD eIMTA, 3GPP TSG-RAN WG2 #83bis, Ljubljana, Slovenia, Oct. 7-11, 2013, pp. 1-5, R2-133391.
(Continued)

*Primary Examiner* — Kibrom T Hailu
(74) *Attorney, Agent, or Firm* — Jefferson IP Law, LLP

(57) ABSTRACT

According to one embodiment of the present invention, suggested art a method for reporting a power headroom report (hereinafter, PHR) of a terminal and an apparatus of the terminal, the method comprising the steps of: determining whether the terminal is operated in dynamic time division multiple access (hereinafter, TDD, time division duplexer) mode; determining whether the terminal receives service from a plurality of serving cells, when it is determined that the terminal is operated in dynamic TDD mode; determining a power headroom type (hereinafter, PH type)
(Continued)

on the basis of a radio resource control (hereinafter, RRC) message and downlink control information (DCI) received from a base station, when it is determined that the terminal receives a service from the plurality of serving cells; and transmitting information about the determined PH type using an extended PHR format. In addition, suggested are a method for receiving a PHR by a base station and a base station apparatus capable of setting a TDD mode in the terminal and receiving the PHR from the terminal.

16 Claims, 16 Drawing Sheets

(51) Int. Cl.
| | | |
|---|---|---|
| *H04W 24/02* | (2009.01) | |
| *H04L 5/00* | (2006.01) | |
| *H04L 5/14* | (2006.01) | |
| *H04W 24/08* | (2009.01) | |
| *H04W 72/04* | (2009.01) | |
| *H04W 24/10* | (2009.01) | |
| *H04W 52/04* | (2009.01) | |

(52) U.S. Cl.
CPC .............. *H04L 5/0091* (2013.01); *H04L 5/14* (2013.01); *H04W 24/02* (2013.01); *H04W 24/08* (2013.01); *H04W 52/365* (2013.01); *H04W 72/042* (2013.01); *H04L 1/1825* (2013.01); *H04L 5/1469* (2013.01); *H04W 24/10* (2013.01); *H04W 52/04* (2013.01)

(58) Field of Classification Search
CPC ... H04L 5/0053; H04L 5/0091; H04L 1/1825; H04L 5/1469; H04W 24/02; H04W 24/08; H04W 52/365; H04W 72/042; H04W 24/10; H04W 52/04
See application file for complete search history.

(56) References Cited

U.S. PATENT DOCUMENTS

| | | |
|---|---|---|
| 2012/0176965 A1 | 7/2012 | Zhu et al. |
| 2013/0028231 A1 | 1/2013 | Zhang et al. |
| 2013/0051259 A1 | 2/2013 | Kim et al. |
| 2014/0029459 A1 | 1/2014 | Kwon et al. |
| 2014/0086112 A1 | 3/2014 | Stern-Berkowitz et al. |
| 2014/0341091 A1 | 11/2014 | Ji et al. |
| 2015/0078154 A1 | 3/2015 | Jain |
| 2015/0078349 A1 | 3/2015 | He et al. |
| 2015/0188690 A1 | 7/2015 | Khoryaev et al. |
| 2015/0350944 A1 | 12/2015 | Chen et al. |
| 2016/0029323 A1 | 1/2016 | Hwang et al. |
| 2016/0242038 A1 | 8/2016 | Lei |

FOREIGN PATENT DOCUMENTS

| | | |
|---|---|---|
| EP | 2901599 A1 | 8/2015 |
| EP | 3101824 A1 | 12/2016 |
| KR | 10-2012-0068953 A | 6/2012 |
| KR | 10-2014-0135331 A | 11/2014 |
| WO | 2014/052645 A1 | 4/2014 |
| WO | 2015/018367 A1 | 2/2015 |
| WO | 2015/187267 A1 | 12/2015 |

OTHER PUBLICATIONS

Texas Instruments, On UL Power Control Enhancements for eIMTA, 3GPP TSG RAN WG1 #74bis, Guangzhou, China, Oct. 7-11, 2013, pp. 1-3, R1-134276.
Mediatek Inc., Power Headroom Reporting in TDD eIMTA, 3GPP TSG-RAN WG1 Meeting #74bis, Guangzhou, China, Oct. 7-11, 2013, pp. 1-5, R1-134434.
Nsn et al., Power Headroom Report for Enhanced UL Power Control in TDD eIMTA, 3GPP TSG-RAN WG1 Meeting #74bis, Guangzhou, China, Oct. 7-11, 2013, R1-134508.
Intel Corporation; "Discussion on Remaining Detalis of UL PC for eIMTA Support"; 3GPP Draft; R1-134121; Sep. 28, 2013, vol. RAN WG1; Guangzhou, China; XP050717311; URL: http://www.3gpp.org/ftp/tsg_ran/WG1_RL1/TSGR1_74b/Docs/.
ZTE, Some Remaining Issues About Uplink Power Control, 3GPP TSG RAN WG1 Meeting #76, Feb. 10-14, 2014, R1-140260, XP050751616, Prague Czech Republic.
ZTE, Some Remaining Issues About Uplink Power Control, 3GPP TSG RAN WG1 Meeting #75, Nov. 11-15, 2013, R1-135364, XP050750948, San Francisco, USA.
3rd Generation Partnership Project; Technical Specification Group Radio Access Network; Evolved Universal Terrestrial Radio Access (E-UTRA); Medium Access Control (MAC) protocol specification (Release 11), 3GPP TS 36.321, Jun. 2013, V11.3.0, XP050712004, Sophia Antipolis, France.
European Search Report dated Oct. 18, 2017, issued in the European Application No. 14861216.1-1854 / 3099101.
Samsung: "Discussion on DRX operation in TDD eIMTA systems", 3GPP Draft; R2-134269 EIMTA DRX; 3rd Generation Partnership Project (3GPP); Mobile Competence Centre; 650, Route des Lucioles; F-06921 Sophia-Antipolis Cedex; France, vol. RAN WG2, No., Nov. 11, 2013-Nov. 15, 2013, Nov. 1, 2013, pp. 1-4, XP050753164, San Francisco, USA.
Mediatek Inc; "Discussion on DRX issues in TDD eIMTA", 3GPP Draft; R2-134069 Discussion on DRX Issues in TDD eIMTA, 3rd Generation Partnership Project(3GPP), Mobile Competence Centre; 350, Route Des Lucioles ; F-06921 Sophia-Antipolis Cedex; France, vol. RAN WG2, No. Nov. 15, 2013-Nov. 15, 2013, Nov. 11, 2013, pp. 1-6, XP050753091, San Francisco, USA.
Mediatek Inc; "DRX operation in TDD eIMTA", 3GPP Draft; R2-133251 DRX Operation in TDD eIMTA, 3rd Generation Partnership Project(3GPP), Mobile Competence Centre; 650, Route Des Lucioles ; F-06921 Sophia-Antipolis Cedex; France, vol. RAN WG2, No., Oct. 7, 2013-Oct. 11, 2013, Oct. 7, 2013, pp. 1-4, XP050718949, Ljubljana, Slovenia.
CATT: "DRX operation for TDD eIMTA", 3GPP Draft; R2-134033 DRX Operation for TDD eIMTA, 3rd Generation Partnership Project (3GPP), Mobile Competence Centre ; 650, Route Des Lucioles; F-06921 Sophia-Antipolis Cedex ; France, vol. RAN WG2, No. San Francisco, USA; Nov. 11, 2013-Nov. 15, 2013 Nov. 2, 2013 (Nov. 2, 2013), XP050753332.
European Office Action dated Apr. 11, 2019, issued in European Application No. 14861216.1.

* cited by examiner

FIG. 4

|   | 0 | 1 | 2 | 3 | 4 | 5 | 6 | 7 | 8 | 9 |   | D | S | U |
|---|---|---|---|---|---|---|---|---|---|---|---|---|---|---|
| 0 | D | S | U | U | U | D | S | U | U | U |   | 2 | 2 | 6 |
| 1 | D | S | U | U | D | D | S | U | U | D |   | 4 | 2 | 4 |
| 2 | D | S | U | D | D | D | S | U | D | D |   | 6 | 2 | 2 |
| 3 | D | S | U | U | U | D | D | D | D | D |   | 6 | 1 | 3 |
| 4 | D | S | U | U | D | D | D | D | D | D |   | 7 | 1 | 2 |
| 5 | D | S | U | D | D | D | D | D | D | D |   | 8 | 1 | 1 |
| 6 | D | S | U | U | U | D | S | U | U | D |   | 3 | 2 | 5 |

FIG. 15
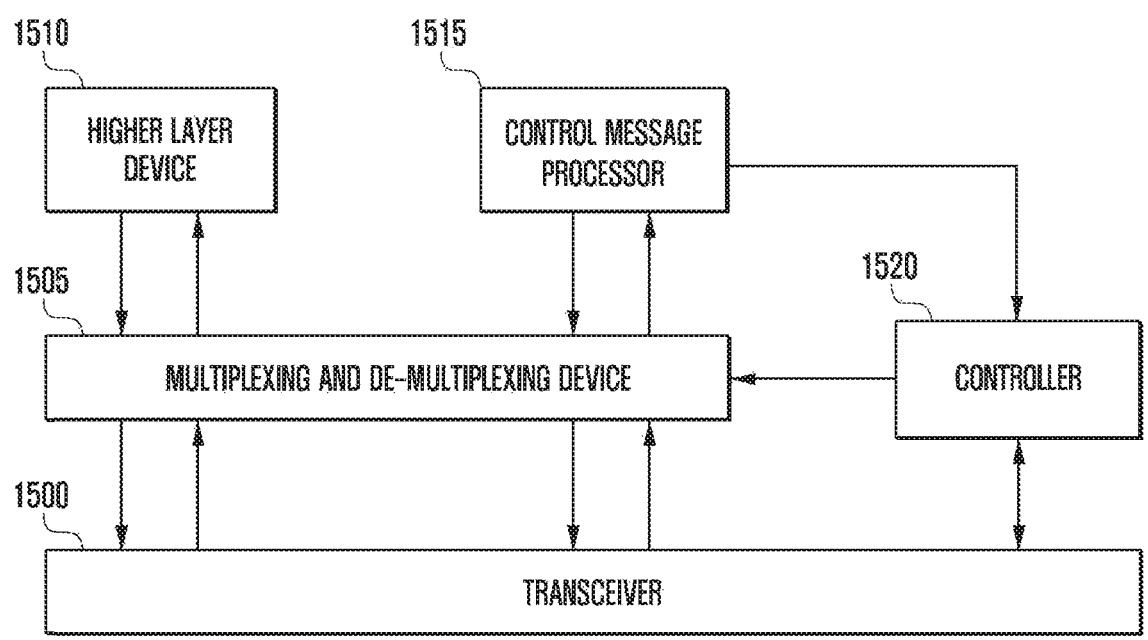
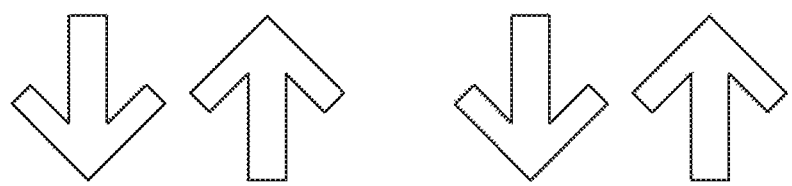

METHOD AND APPARATUS FOR CONTROLLING POWER HEADROOM REPORT AND HYBRID AUTOMATIC RETRANSMISSION IN MOBILE COMMUNICATION SYSTEM

CROSS-REFERENCE TO RELATED APPLICATION(S)

This application is a continuation of U.S. application Ser. No. 15/036,652, filed on May 13, 2016 which was the National Stage of International application PCT/KR2014/010924 filed on Nov. 13, 2014, which claimed the benefit under 35 U.S.C. § 119(a) of a Korean patent application number 10-2013-0137672, filed on Nov. 13, 2013, in the Korean Intellectual Property Office, and of a Korean patent application number 10-2014-0032849, filed on Mar. 20, 2014, in the Korean Intellectual Property Office, the entire disclosure of each of which is incorporated by reference herein in its entirety.

TECHNICAL FIELD

The present invention relates to a method and an apparatus for controlling a Power Headroom Report (PHR) and a Hybrid Automatic Repeat reQuest (HARQ).

BACKGROUND ART

In general, mobile communication systems have been developed to provide communication while securing mobility of users. With the rapid development of technologies, the mobile communication systems have reached a stage of providing high-speed data communication services as well as voice communication.

Currently, a standardization operation of Long Term Evolution Advanced (LTE-A) is being progressed by the 3rd Generation Partnership Project (3GPP) as one of next generation mobile communication systems. LTE-A is a technology of implementing high speed packet-based communication with a transmission rate of up to about 100 Mbps. To this end, several methods are being discussed, including a method of reducing the number of nodes located on a communication channel by simplifying a network architecture, a method of making wireless protocols closely access a wireless channel to the maximum, and the like.

Meanwhile, unlike a voice service, allocable resources of a data service are determined according to an amount of data to be transmitted and a channel status. Accordingly, a wireless communication system such as the mobile communication system manages resources such that transmission resources are allocated in consideration of an amount of resources to be transmitted by a scheduler, a channel status, and an amount of data. The management is identically implemented in LTE which is one of the next generation mobile communication systems, and a scheduler located in the BS manages and allocates wireless transmission resources.

Recently, discussion about an evolved LTE communication system (LTE-A), in which various new technologies are grafted into the LTE communication system to increase a transmission rate, is being progressed in earnest. A representative of the newly introduced technologies may be carrier aggregation. A carrier aggregation technology may use a primary carrier and one or more secondary carriers to significantly increase transmission amounts by the number of secondary carriers rather than using only one secondary carrier between a User Equipment (UE) and an evolved Node B (eNB) in the conventional communication. Meanwhile, in LTE, the primary carrier is referred to as a Primary Cell (PCell) and the secondary carrier is referred to as a Secondary Cell (SCell).

As another LTE-A technology, the standard of enhanced TDD Interference Management and Traffic Adaptation (eIMTA) is being progressed as a work item in 3GPP Rel-12. The corresponding standard is largely different from the conventional LTE TDD system in that a transmission direction of each subframe of radio frames is fixedly set to each BS in the conventional LTE TDD system but the setting can be dynamically changed in real time in the corresponding standard.

DISCLOSURE OF INVENTION

A technical object to be achieved by the present invention is to provide a method and an apparatus for efficiently controlling a Power Headroom Report (PHR) and Hybrid Automatic Repeat reQuest (HARQ) in a mobile communication system. Embodiments of the present invention provide a method and an apparatus for processing the PHR and HARQ of serving cells having dynamic TDD configuration information in a mobile communication system.

Further, another technical object of the present invention is to provide a method and an apparatus for effectively controlling measurement intervals of serving cells and DRX and processing HARQ when carrier aggregation is used for serving cells using different duplex modes.

In accordance with an aspect of the present invention, a method of transmitting a PHR by a User Equipment (UE) is provided. The method includes: determining whether the UE operates in a dynamic time division multiple access (hereinafter, Time Division Duplexer: TDD) mode; determining whether the UE receives a service from a plurality of serving cells when it is determined that the UE operates in the dynamic TDD mode; determining a Power Headroom type (hereinafter, PH type) on the basis of a radio resource control (hereinafter, RRC) message and Downlink Control Information (DCI) received from an Evolved Node B (ENB) when it is determined that the UE receives the service from the plurality of serving cells; and transmitting information on the determined PH type by using an extended Power Headroom Report (PHR) format.

In accordance with another aspect of the present invention, an apparatus of a User Equipment (UE) is provided. The apparatus includes: a transceiver for communicating with at least one network node; and a controller for making a control to determine whether the UE operates in a dynamic time division multiple access (hereinafter, Time Division Duplexer: TDD) mode, to determine whether the UE receives a service from a plurality of serving cells when it is determined that the UE operates in the dynamic TDD mode, to determine a Power Headroom type (hereinafter, PH type) on the basis of a radio resource control (hereinafter, RRC) message and Downlink Control Information (DCI) received from an Evolved Node B (ENB) when it is determined that the UE receives the service from the plurality of serving cells, and to transmit information on the determined PH type by using an extended Power Headroom Report (PHR) format.

In accordance with another aspect of the present invention, a method of receiving a PHR by an Evolved Node B (ENB) is provided. The method includes: transmitting first TDD configuration information an second TDD configuration information to at least one User Equipment (UE);

receiving a response message from the UE in response to the second TDD configuration information; configuring a dynamic TDD mode in the UE by transmitting third TDD configuration information when the response message is received; and receiving a MAC PDU including PHR information from the UE, wherein the MAC PDU includes a MAC CE including PH information on a fixed uplink subframe and a MAC CE including PH information on a dynamic uplink subframe.

In accordance with another aspect of the present invention, an apparatus of an Evolved Node B (ENB) is provided. The apparatus includes: a transceiver for performing data communication with at least one network node; and a controller for making a control to transmit first TDD configuration information and second TDD configuration information to at least one User Equipment (UE), to receive a response message from the UE in response to the second TDD configuration information, to configure a dynamic TDD mode in the UE by transmitting third TDD configuration information when the response message is received, and to receive a MAC PDU including PHR information from the UE, wherein the MAC PDU includes a MAC CE including PH information on a fixed uplink subframe and a MAC CE including PH information on a dynamic uplink subframe.

In accordance with another aspect of the present invention, a method of performing a Power Headroom Report (PHR) by a User Equipment (UE) in a mobile communication system is provided. The method includes: when the PHR is triggered by the UE, determining whether the UE operates in a dynamic time division multiple access (Time Division Duplexer: TDD) mode; and, when the UE operates in the dynamic TDD mode, transmitting a first PHR for a dynamic subframe and a second PHR for a fixed subframe to an Evolved Node B (ENB).

In accordance with another aspect of the present invention, an apparatus of a User Equipment (UE) for transmitting a Power Headroom Report (PHR) in a mobile communication system is provided. The apparatus includes: a transceiver for communicating with one or more network nodes; and a controller for, when the PHR is triggered in the UE, making a control to determine whether the UE operates in a dynamic time division multiple access (Time Division Duplexer: TDD) mode and, when the UE operates in the dynamic TDD mode, to transmit a first PHR for a dynamic subframe and a second PHR for a fixed subframe to an Evolved Node B (ENB).

In accordance with another aspect of the present invention, a method of receiving a Power Headroom Report (PHR) by an Evolved Node B (ENB) in a mobile communication system is provided. The method includes: configuring a dynamic time division multiple access (Time Division Duplexer: TDD) mode in at least one User Equipment (UE); transmitting a PHR trigger message making a request for transmitting a first PHR for a dynamic subframe and a second PHR for a fixed subframe to the ENB when the UE operates in the dynamic TDD mode; and receiving a PHR corresponding to the PHR trigger message.

In accordance with another aspect of the present invention, an apparatus of an Evolved Node B (ENB) for receiving a Power Headroom Report (PHR) in a mobile communication system is provided. The apparatus includes: a transceiver for communicating with at least one network node; and a controller for making a control to configure a dynamic time division multiple access (Time Division Duplexer: TDD) mode in at least one User Equipment (UE); to transmit a PHR trigger message making a request for transmitting a first PHR for a dynamic subframe and a second PHR for a fixed subframe to the ENB when the UE operates in the dynamic TDD mode; and to receive a PHR corresponding to the PHR trigger message.

In accordance with another aspect of the present invention, a method of controlling a Hybrid Automatic Repeat reQuest (HARQ) by a User Equipment (UE) in a mobile communication system is provided. The method includes: allocating a downlink data channel received from an Evolved Node B (ENB) to an HARQ processor; configuring an HARQ Round Trip Time (RTT) timer based on a TDD configuration RRC message received from the ENB when the UE operates in a dynamic time division multiple access (Time Division Duplexer: TDD) mode; and transmitting information indicating a decoding result of the data allocated to the HARQ processor to the ENB while the HARQ RTT timer is driven.

In accordance with another aspect of the present invention, an apparatus of a User Equipment (UE) for controlling a Hybrid Automatic Repeat reQuest (HARQ) in a mobile communication system is provided. The apparatus includes: a transceiver for communicating with at least one network node; and a controller for making a control to allocate a downlink data channel received from an Evolved Node B (ENB) to an HARQ processor; to configure an HARQ Round Trip Time (RTT) timer based on a TDD configuration RRC message received from the ENB when the UE operates in a dynamic time division multiple access (Time Division Duplexer: TDD) mode; and to transmit information indicating a decoding result of the data allocated to the HARQ processor to the ENB while the HARQ RTT timer is driven.

According to embodiments of the present invention, it is possible to provide a method and an apparatus for efficiently controlling a Power Headroom Report (PHR) and Hybrid Automatic Repeat reQuest (HARQ) in a mobile communication system. Therefore, according to embodiments of the present invention, serving cells having a dynamic TDD mode can effectively transmit the PHR and increase a data transmission success rate through an efficient HARQ operation.

Further, according to embodiments of the present invention, it is possible to simultaneously report a PH for a fixed subframe and a PH for a dynamic subframe.

In addition, according to embodiments of the present invention, a UE can provide information related to a transmission output to an ENB to perform smooth scheduling in an eIMTA environment, and a method and an apparatus for driving a discontinuous reception-related timer can be provided.

BRIEF DESCRIPTION OF THE DRAWINGS

FIG. 4 is a view illustrating a transmission direction and purpose of a subframe based on a TDD configuration according to an embodiment of the present invention;

FIG. 15 is a block diagram illustrating the UE according to an embodiment of the present invention.

MODE FOR THE INVENTION

Figure 1:
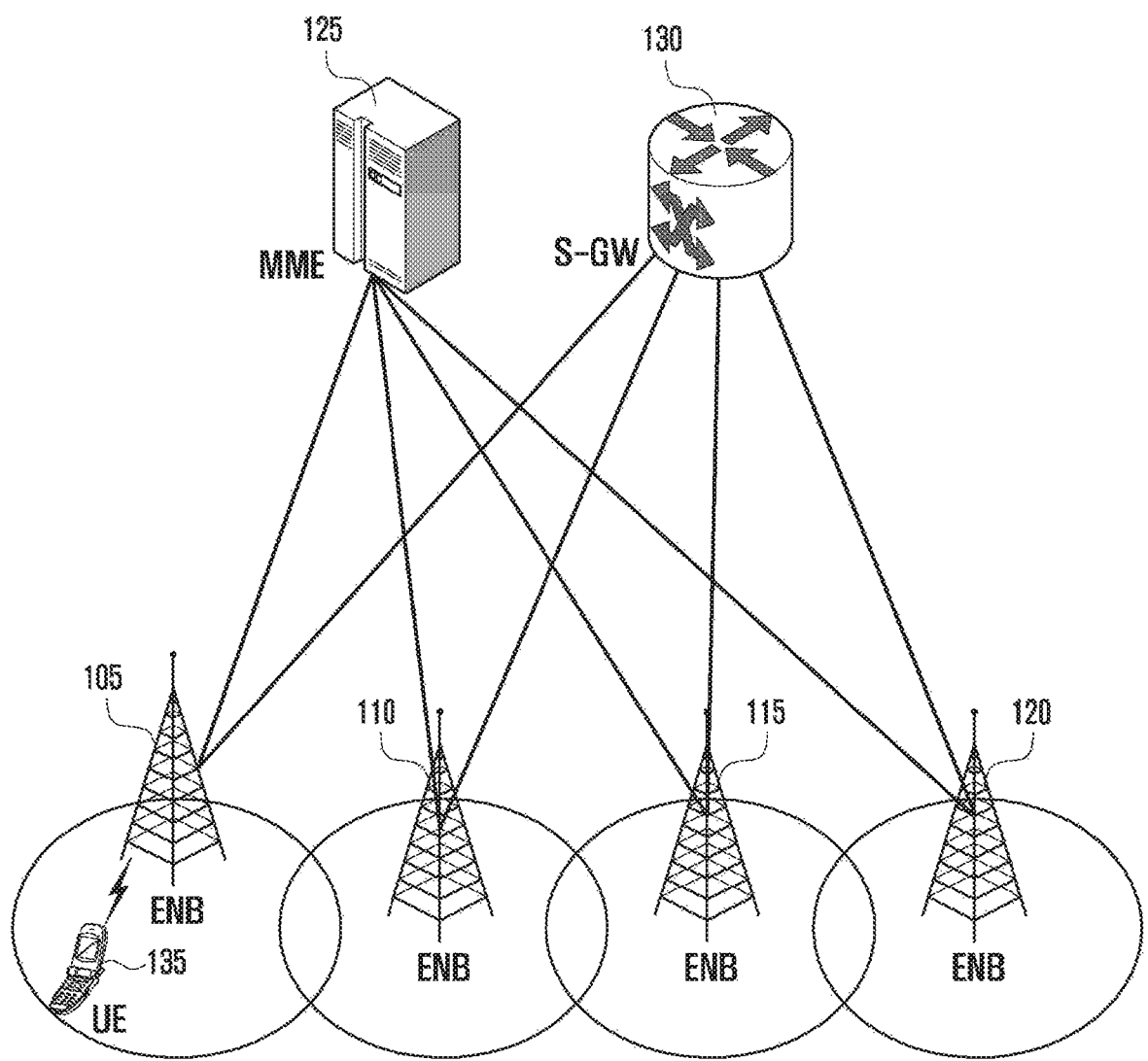
FIG. 1 illustrates a structure of an LTE system to which the present invention is applied.

Hereinafter, various embodiments will be described with reference to the accompanying drawings. It should be noted that the same elements will be designated by the same reference numerals although they are shown in different drawings. Further, a detailed description of a known function and configuration which may make the subject matter of the present invention unclear will be omitted. Hereinafter, it should be noted that only the descriptions will be provided that may help understanding the operations provided in association with the various embodiments of the present invention, and other descriptions will be omitted to avoid making the subject matter of the present invention rather unclear.

Embodiments of the present invention relate to a method and an apparatus for effectively controlling a Power Headroom report (PHR) of serving cells having different TDD configuration information in carrier aggregation or single carrier transmission of a mobile communication system. Further, embodiments of the present invention relate to a method and an apparatus for processing Hybrid Automatic Repeat reQuest (HARQ) in carrier aggregation and single carrier transmission.

As described above, as the cell size decreases and demands for uplink of user traffic increase according to the evolution of LTE-A technologies, the need of various TDD configurations increase based on a user traffic pattern in a time division multiple access (TDD) system. In order to meet the demands, embodiments of the present invention provide a method in which the UE provides information on a transmission output to the ENB and performs an operation related to discontinuous reception when a TDD configuration is dynamically changed.

In the TDD configuration, a changeable subframe and a non-changeable subframe are configured and are referred to as a fixed subframe and a dynamic (flexible) subframe, respectively. The fixed subframe corresponds to a subframe that is not dynamically changed in TDD configuration information broadcasted through a System Information block (SIB) by the ENB identically in the conventional static LTE TDD system. In the fixed subframe, a transmission direction of the corresponding subframe is not changed during an operation between the UE and the ENB. The dynamic subframe corresponds to a subframe that can be dynamically changed from an uplink subframe to a downlink subframe or from a downlink subframe to an uplink subframe during an operation between the UE and the ENB.

Through such a dynamic TDD configuration, a mutual interference effect between adjacent cells may occur, and the size thereof may significantly increase compared to the conventional fixed TDD configuration method. When all existing cells use the fixed TDD configuration, the same TDD configuration as that of adjacent ENBs is used, so that interference can be controlled. However, in the dynamic TDD configuration, interference may increase due to different transmission directions of adjacent cells. In uplink transmission of the UE in a current cell, the ENB of the current cell may be influenced by ENB downlink transmission in an adjacent cell. In contrast, in downlink transmission of the UE in the current cell, interference may occur due to UE uplink transmission in the adjacent cell.

In the fixed TDD configuration, UE downlink transmission in the current cell may receive interference due to downlink transmission of adjacent cells but the size of interference signals is small. However, in the dynamic TDD configuration, an intensity of the interference signal received in an opposite transmission direction may give a great effect to the performance. In order to solve the problem, the ENB may make a request for increasing an uplink output to the UE when interference occurs. When the UE which performs uplink transmission in the current cell receives interference of downlink signals from adjacent cell ENBs and thus the ENB of the current cell cannot properly decode the signal received from the UE, the corresponding ENB allows the UE to increase the transmission output up to a level at which the corresponding signal can be analyzed. To this end, the ENB should receive a report about the transmission output capability of the UE from the UE. The report is called a Power Headroom Report (PHR). The PHR includes information on outputs which can be transmitted to the current cell or all cells activated for the UE through Carrier Aggregation (CA). The PHR may be periodically transmitted, or the UE may transmit PHR information to the ENB according to a change in a path loss between the UE and the ENB.

When the transmission output is controlled based on the PHR as the compensation for interference generated due to the dynamic TDD configuration, a transmission output configuration depending on two interference situations is required unlink the fixed TDD configuration. In the fixed TDD configuration, the ENB allows the UE to increase or decrease an uplink transmission output according to a received signal strength or a frequency bandwidth allocated to the UE based on the PHR received from the UE. The corresponding uplink transmission output may be identically applied to all subframes that are configured for uplink transmission. However, in the dynamic TDD configuration, subframes may be divided into the fixed subframe and the dynamic subframe as described above. Since interference of adjacent cells is constant in the fixed subframe, the same transmission output can be applied to the corresponding subframe. However, since interference of adjacent cells is continuously changed in the dynamic subframe, the UE transmission output should be continuously controlled in the corresponding subframe.

In order to control the transmission outputs for the two subframes (fixed subframe and dynamic subframe), the UE should transmit the PHR corresponding to each subframe to the ENB. Accordingly, a method of transmitting the PHR by the UE in a dynamic TDD configuration cell will be described below as an embodiment.

For an HARQ, an acknowledge (ACK) is received in a particular uplink or downlink subframe in a fixed TDD configuration cell. According to the TDD configuration, HARQ Round Trip Time (HARQ RTT) of k+4 is required. Here, k is defined in the standard according to each TDD configuration since the uplink or downlink frame varies depending on the TDD configuration. However, in the dynamic TDD configuration, the TDD configuration can be dynamically changed according to a physical layer signal, so that the k value cannot be determined based on the conventional fixed TDD configuration cell.

In other words, in the fixed TDD configuration, since k+4 corresponding to the HARQ RTT for downlink transmission is determined based on system information SIB1, the k+4 value is not changed according to time. However, in the dynamic TDD configuration, when TDD is configured as 1 at a time point when downlink data is initially received and then the TDD configuration value is changed to 3 during a period of k+4, the k+4 value is changed. Further, when the UE has to receive data retransmission from the ENB after k+4, reception of re-transmission may be not possible if the corresponding subframe is a subframe which can be dynamically changed. In addition, the UE should continuously monitor a Physical Downlink Control Channel (PDCCH) for a particular subframe after k+4 to receive the re-transmission. The number of subframes to be monitored is variable since the dynamic subframe can be used for uplink or downlink. Accordingly, an example of an HARQ operation method and a discontinuous reception operation in the dynamic TDD configuration cell will be described below according to an embodiment of the present invention.

Prior to the description the present invention, an LTE system, an LTE protocol structure, and a carrier aggregation technology will be briefly described.

FIG. 1 illustrates a structure of an LTE system to which the present invention is applied.

Referring to FIG. 1, a radio access network of the LTE system includes next generation Evolved Node Bs (hereinafter, referred to as ENBs, an Node Bs, or a base station) 105, 110, 115 and 120, an MME (Mobility Management Entity) 125, and a S-GW (Serving-Gateway) 130. A UE (User Equipment or a terminal) 135 may access an external network through the ENBs 105 to 120 and the S-GW 130.

In FIG. 1, the ENBs 105 to 120 correspond to conventional Node Bs of a UMTS (Universal Mobile Telecommunications System). The ENB is connected to the UE 135 through a wireless channel, and performs a more complicated role than the conventional node B. In the LTE system, since all user traffic including a real time service such as a VoIP (Voice over IP) through an Internet protocol are serviced through a shared channel, an apparatus for collecting and scheduling status information on buffer statuses of UEs, available transmission power status, and channel statuses is required, and the ENBs 105 to 120 serve as this apparatus. One ENB generally controls a plurality of cells. For example, in order to implement a transmission rate of 100 Mbps, the LTE system uses an OFDM (Orthogonal Frequency Division Multiplexing) as a wireless access technology in a bandwidth of 20 MHz. Further, an AMC (Adaptive Modulation and Coding) scheme of determining a modulation scheme and a channel coding rate is applied according to a channel status of the UE. The S-GW 130 is a device for providing a data bearer, and generates or removes the data bearer under a control of the MME 125.

The MME is a device for performing various control functions as well as a mobility management function with respect to the UE, and is connected to a plurality of ENBs.

Figure 2:
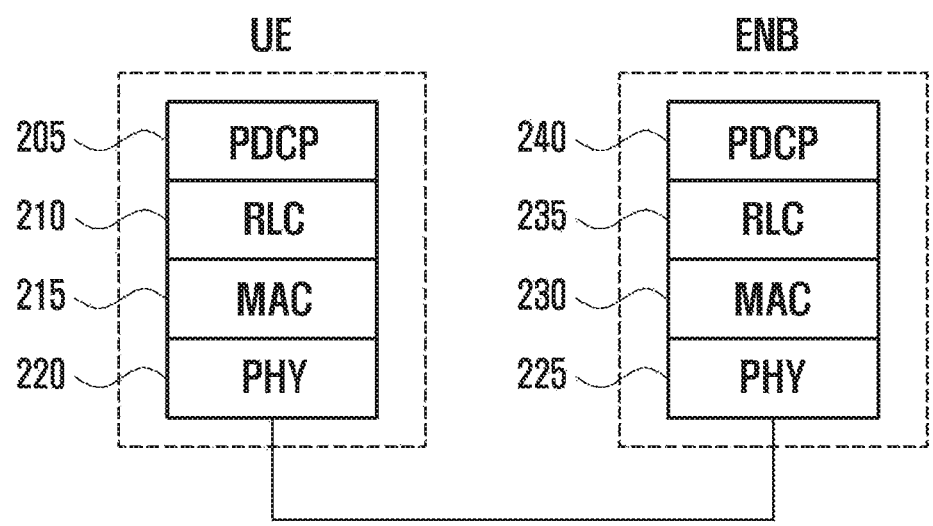
FIG. 2 is a view illustrating a wireless protocol structure in the LTE system to which the present disclosure is applied.

FIG. 2 is a view illustrating a wireless protocol structure in the LTE system to which the present invention is applied.

Referring to FIG. 2, the UE and the ENB includes PDCPs (Packet Data Convergence Protocols) 205 and 240, RLCs (Radio Link Controls) 210 and 235, Medium Access Controls (MACs) 215 and 230, respectively, in the wireless protocol of the LTE system. The PDCPs (Packet Data Convergence Protocols) 205 and 240 perform an operation of compressing/reconstructing an IP header, and the RLCs (Radio Link Controls) 210 and 235 reconfigure a PDCP PDU (Packet Data Unit) to have a proper size. The MACs 215 and 230 is connected to various RLC layer devices configured in one UE, and performs an operation for multiplexing RLC PDUs to MAC PDU and de-multiplexing the RLC PDUs from the MAC PDU. The PHY layers 220 and 225 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer. Further, the PHY layer uses HARQ (Hybrid ARQ) to correct an additional error, and a receiving side transmits in 1 bit information on whether a packet transmitted by a transmitting side is received. The information is referred to as HARQ ACK/NACK information. Downlink HARQ ACK/NACK information on uplink transmission may be transmitted through a Physical Hybrid-ARQ Indicator Channel (PHICH), and uplink HARQ ACK/NACK information on downlink transmission may be transmitted through a Physical Uplink Control Channel (PUCCH) or a Physical Uplink Shared Channel (PUSCH).

Figure 3:
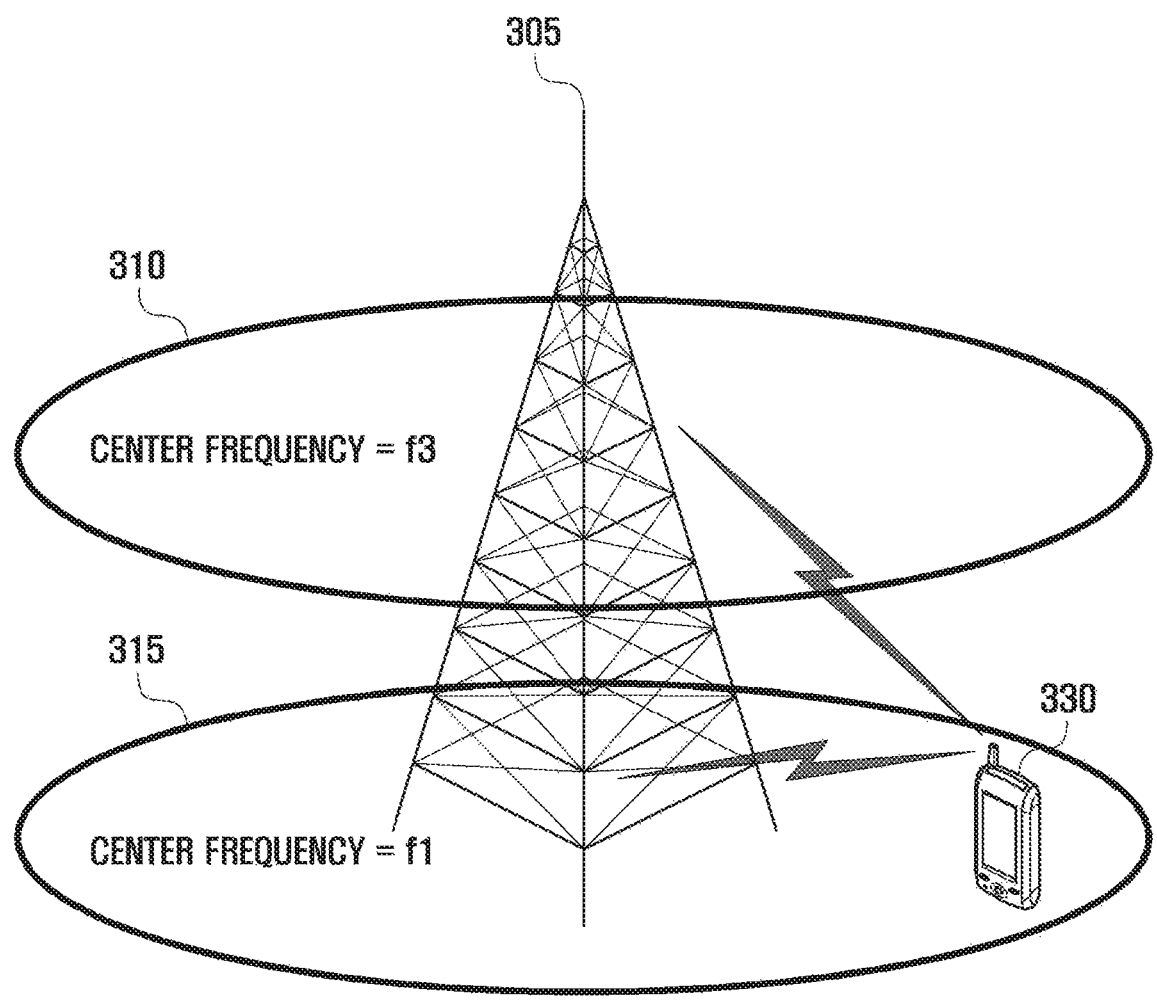
FIG. 3 is a view illustrating carrier aggregation by a UE.

FIG. 3 is a view illustrating carrier aggregation by the UE.

Referring to FIG. 3, one ENB generally transmits and receives multiple carriers over several frequency bands. For example, when an ENB 305 transmits a carrier 315 of center frequency f1 and a carrier 310 of center frequency f3, one UE transmits/receives data by using one of the two carriers in the conventional art. However, the UE having a carrier aggregation capability can simultaneously transmit/receive data from a plurality of carriers. The ENB 305 may allocate many more carriers to the UE 330 with the carrier aggregation capability according to circumstances, so as to improve the transmission rate of the UE 330.

When one forward carrier and one backward carrier transmitted/received by one ENB configure one cell, a traditional meaning of carrier aggregation may be understood as the UE transmitting/receiving data through a plurality of cells at the same time. Accordingly, a maximum transmission rate increases in proportion to the number of aggregated carriers.

In the following description of the present invention, receiving data through a predetermined forward carrier or transmitting data through a predetermined backward carrier by the UE may have the same meaning as transmitting/receiving data through a center frequency, which characterizes the carrier, and a control channel and a data channel, which are provided by a cell corresponding to a frequency band.

FIG. 4 illustrates different uplink/downlink transmission configurations for each of a total of 7 subframes in the TDD configuration. Subframe information used in uplink/downlink is referred to as TDD configuration, and frequency bands are alternately used in uplink for a particular subframe and in downlink for another subframe in TDD. The UE should accurately know the subframe used for uplink/downlink, and the ENB provides such subframe information to the UE in advance. According to the TDD configuration, each subframe is divided into an uplink subframe, a downlink subframe, and a special subframe.

In FIG. 4, downlink subframes marked with "D" is used for transmitting downlink data and uplink subframes marked with "U" is allocated for transmitting uplink data. The special subframes are marked with "S" and correspond to subframes between the downlink subframe and the uplink subframe. The reason of the existence of the special subframe is because a timing when each UE completely receives the downlink subframe and a timing when each UE transmits uplink data are different from each other according to a location of the UE. For example, the UE spaced apart from the ENB receives data from the ENB later. In contrast, in order to allow the ENB to receive data from the UE within a particular time, the UE should start data transmission earlier. The special subframe is not needed between the uplink subframe and the downlink subframe.

Figure 5:
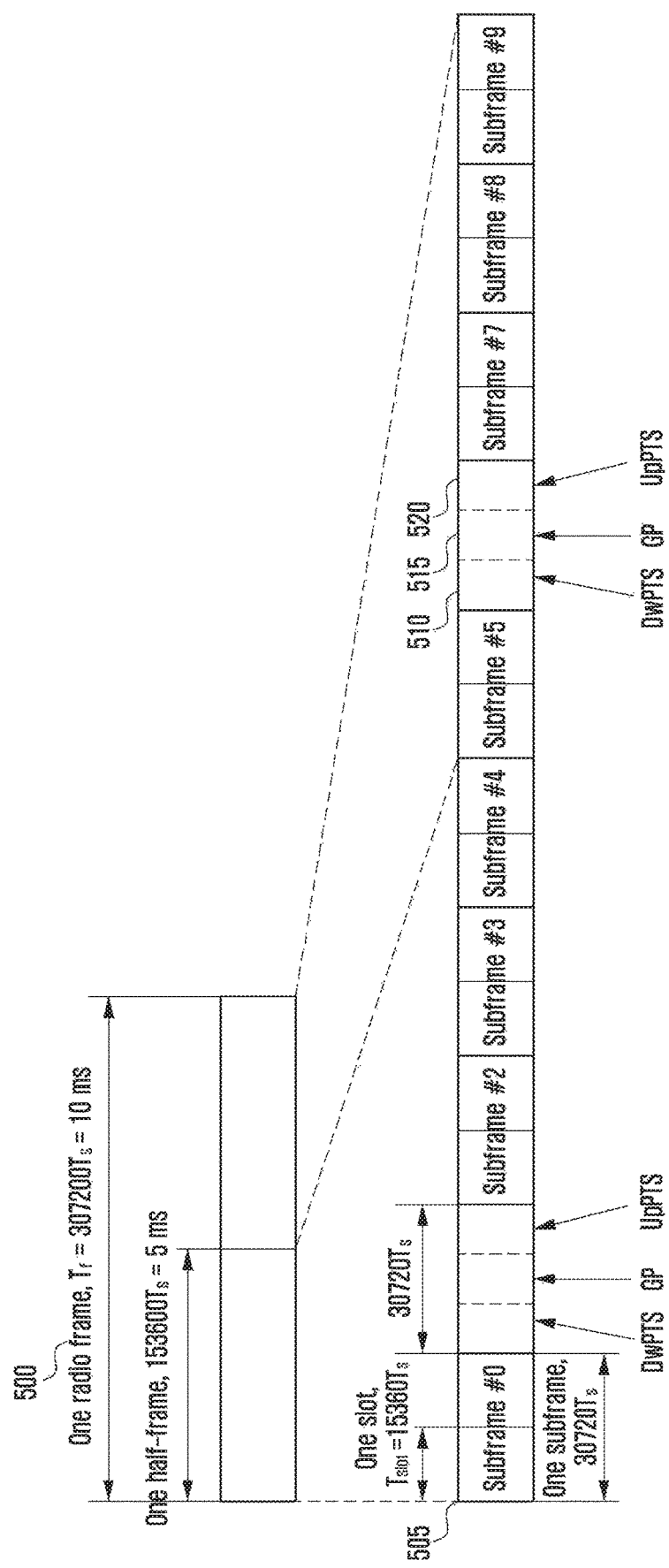
FIG. 5 is a view illustrating a frame structure in TDD according to an embodiment of the present invention.

FIG. 5 is a view illustrating a frame structure in TDD. One radio frame 500 having the duration of 10 ms consists of 10 subframes. Each subframe has the duration of 1 ms and consists of 2 slots. In FIG. 5, a subframe 505 and a subframe 515 are downlink subframes and a subframe 510 and a subframe 535 are uplink subframes. That is, FIG. 5 corresponds to one of the TDD configurations 0, 1, 2, and 6. Accordingly, a subframe between the downlink subframe and the uplink subframe is a special subframe. The special subframe is divided into three intervals such as a Downlink Pilot TimeSlot (DwPTS) 520, a Guard Period (GP) 525, and an Uplink Pilot TimeSlot (UpPTS) 530. DwPTS corresponds to a time interval for downlink reception and UpPTS corresponds to a time interval for uplink transmission. No transmission/reception is performed in the GP. Optimal DwPTS and UpPTS values may vary depending on a propagation environment. Accordingly, the ENB informs the UE of proper DwPTS and UpPTS values in advance, and the TDD configuration and the DwPTS and UpPTS values are inserted into IE Tdd-Config of SystemInformationBlockType1 (SIB1) broadcasted from the ENB and then transmitted to the UE.

Figure 6:
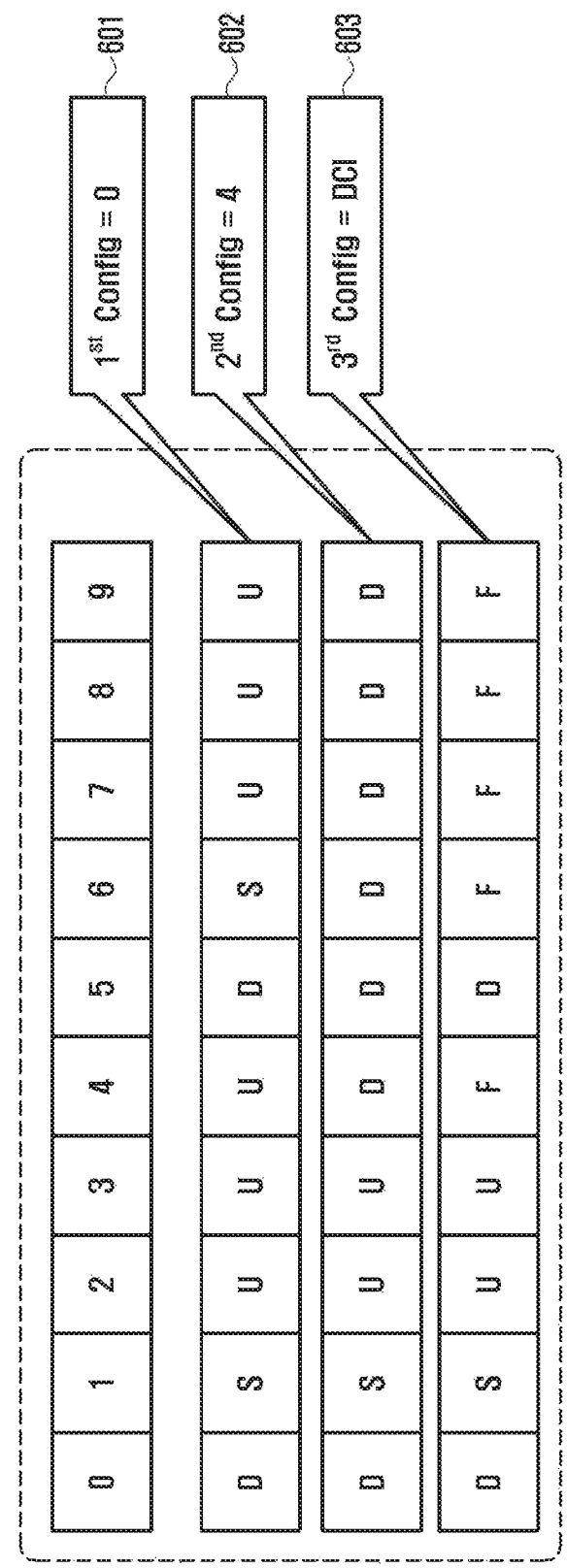
FIG. 6 is a view illustrating a dynamic TDD configuration method according to an embodiment of the present invention.

FIG. 6 is a view illustrating a dynamic TDD configuration method according to an embodiment. The TDD configuration may be broadcasted to the UE through Tdd-Config of SIB1 for an interworking with the existing UE. The corresponding UE may identify the TDD configuration of the ENB by periodically receiving system information as indicated by reference numeral 601. The process may be the same as the conventional fixed TDD configuration method, and a dynamic TDD configuration operation can be performed through a second configuration 602 and a third configuration 603. As illustrated in FIG. 6, in a case of the second TDD configuration, the UE serves to perform the TDD configuration for the dynamic TDD operation and trigger the corresponding operation. The corresponding configuration provides a reference by which the UE transmits acknowledgement of downlink transmission. Accordingly, through the corresponding configuration, a minimum of uplink subframes may be configured. A new TDD configuration may be performed through a dedicated RRC configuration message (RRC message) by the ENB. Alternatively, the UE may be periodically informed of new TDD configuration information through newly designated system information (for example, SIB x).

When the TDD configuration is informed to the UE through the system information and a higher layer signal message, that is, the RRC message, the TDD configuration cannot be quickly changed in unit of the subframes or the radio frames. That is, the RRC message is unsuitable for the dynamic and quick change in the TDD configuration in the unit of 10, 20, 40, or 80 msec since a transmission period of SIB1 is basically 80 msec, a transmission period of newly added system information (SIBx) is expected to be larger, and a delay of dozens of msec may occur when the TDD configuration is informed to the UE through the RRC message. Accordingly, the TDD configuration information using the second RRC message may be used for the purpose of an indication of a DL HARQ reference rather than a dynamical change in the TDD configuration.

When the TDD configuration is changed by using an L1 signal message such as third Downlink Control Information (DCI), the UE may apply the TDD configuration more rapidly. The TDD configuration may be changed every 10 msec corresponding to the radio frame unit. When the UE receives DCI including new TDD configuration information, the UE may initiate communication with the ENB by using the corresponding TDD configuration from the next radio frame. The L1 signal message (that is, eIMTA command) may be transmitted to the UE every 10, 20, 40, or 80 msec, and the UE for the corresponding message may be identified by a UE radio identifier (C-RNTI). The UE may periodically receive the message from the ENB, but may not receive the corresponding command. When the UE does not receive the L1 signal continuously transmitted in a particular subframe every 40 msec, the UE determines that the UE has failed in receiving the L1 command.

FIG. 6 illustrates an example of the aforementioned three-step TDD configuration process. When the TDD configuration received through first system information SIB1 corresponds to 0 as indicated by reference numeral 601, a first row of the TDD configuration of FIG. 4 includes two "D" subframes, two "S" subframes, and the remaining "U" subframes. A subframe considered as a fixed subframe is the subframe corresponding to "D" in the first configuration. In FIG. 6, zeroth and fifth subframes are set as the "D" downlink subframes and the two downlink subframes are defined as fixed downlink subframes. It is because the downlink subframe in the first configuration is always used as the downlink subframe regardless of the second and third TDD configuration processes.

The UE recognizes the second TDD configuration as a fourth configuration (fourth TDD configuration of FIG. 4) through the RRC message or other system information (SIB x) as indicated by reference numeral 602. The corresponding configuration is indicated by a second subframe row in FIG. 6. The fixed subframe corresponds to the uplink subframe set as "U". Accordingly, second and third subframes are determined as the fixed uplink subframes. As described above in the "S" frame, when there is a change from the downlink subframe to the uplink subframe, the "S" frame is needed. Accordingly, as illustrated in FIG. 6, the first subframe is designated as a fixed "S" subframe. Fourth, seventh, eighth, and ninth subframes become dynamic subframes which may be set as "D" or "U" in the third TDD configuration process using DCI as indicated by reference numeral 603. In other words, as illustrated in the TDD configuration of FIG. 4, since zeroth, first, second, and fifth subframes have the same transmission direction in any configuration, there is no change in the transmission direction by the RRC message or DCI but the remaining subframes can be dynamically changed.

A UE operation for recognizing the TDD configuration, the uplink subframe, the downlink subframe, and the S subframe may be determined below. When the UE camps on a predetermined serving cell, the UE receives first TDD configuration information and determines the uplink subframe, the downlink subframe, and the S subframe according to the first TDD configuration information. Further, all the determined subframes may be considered as fixed subframes. Thereafter, when a dynamic TDD function of the UE is set by the ENB at a predetermined time, the UE acquires second TDD configuration information. The UE determines subframes specified as the downlink subframes as fixed downlink subframes in the first TDD configuration information, and subframes specified as uplink subframes as fixed uplink subframes and the first subframe as the fixed S subframe in the second TDD configuration information. Further, the remaining subframes, which are not the fixed subframes, are determined as dynamic subframes.

Thereafter, the UE acquires third TDD configuration information through DCI information by monitoring a Physical Downlink Control Channel (PDCCH). The UE determines a type of the dynamic subframe with reference to the third TDD configuration information. For example, when the third TDD configuration information corresponds to 4, types of sixth, seventh, eighth, and ninth dynamic subframes are determined as the downlink subframes with reference to the sixth, seventh, eighth, and ninth subframes of the third TDD configuration information.

Figure 7:
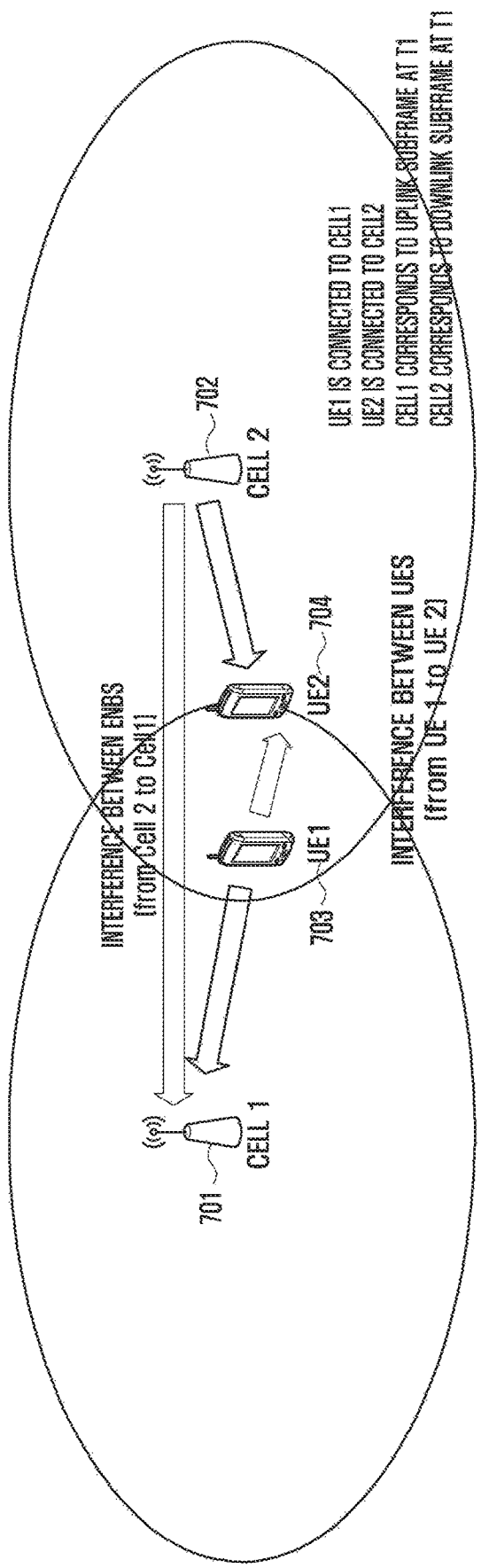
FIG. 7 is a view illustrating adjacent cell interference based on a dynamic TDD configuration according to an embodiment of the present invention.

FIG. 7 illustrates an adjacent cell interference phenomenon which may be generated due to a difference in an uplink/downlink transmission direction from an adjacent cell in the dynamic TDD configuration. In FIG. 7, UE1 703 accesses ENB cell1 701 to perform uplink transmission, and UE2 704 accesses ENB cell2 702 to perform downlink transmission. In this case, cell1 701 simultaneously receives a signal from UE1 703 and an interference signal from cell2 702 corresponding to an adjacent cell. At this time, since a transmission output of the adjacent cell 702 is relatively larger than an output of UE1 703, cell1 701 may not analyze (decode) the signal received from UE1 properly.

Further, the signal transmitted from UE1 703 to cell1 701 through uplink is highly likely to be larger than the signal received by UE2 704 from cell2 702. It is because an interval between UE1 703 and UE2 704 may be much narrower than an interval between UE2 704 and cell2 702. In this case, a reception capability may deteriorate due to uplink transmission by the adjacent cell UE. However, the adjacent cell interference phenomenon generated due to the difference in the transmission direction may not occur in the fixed subframe. Of course, this is achieved in the conventional TDD-based system in which cells are properly designed to avoid the adjacent cell interference. Accordingly, it is highly likely to differently generate the interference phenomenon between the fixed subframe and the dynamic subframe in the dynamic TDD system. To this end, transmission outputs required by respective subframes may also different.

In an equation for calculating a transmission output required by a Physical Uplink Shared CHannel (PUSCH), that is, an uplink user channel, α and Po may be set as different values. The corresponding values are informed to the UE by the ENB based on a received signal value measured in each subframe. Further, a separate transmission output control loop may be applied. In other words, Transmission Power control (TPC) received in the fixed subframe may be applied only to the uplink transmission through the fixed uplink subframe, TPC received in the dynamic subframe may be applied only to the uplink transmission through the dynamic uplink subframe, and fc(i) in which an accumulated value of the TPC is stored may be separately managed.

$$P_{PUSCH,c}(i) = \min\begin{Bmatrix} P_{CMAX,c}(i), \\ 10\log_{10}(M_{PUSCH,c}(j)) + P_{O\_PUSCH,c}(j) + \\ \alpha_c(j) \cdot PL_c + \Delta_{TF,c}(i) + f_c(i) \end{Bmatrix}$$

A detailed description of the above equation follows the standard 36.213.

Figure 8:
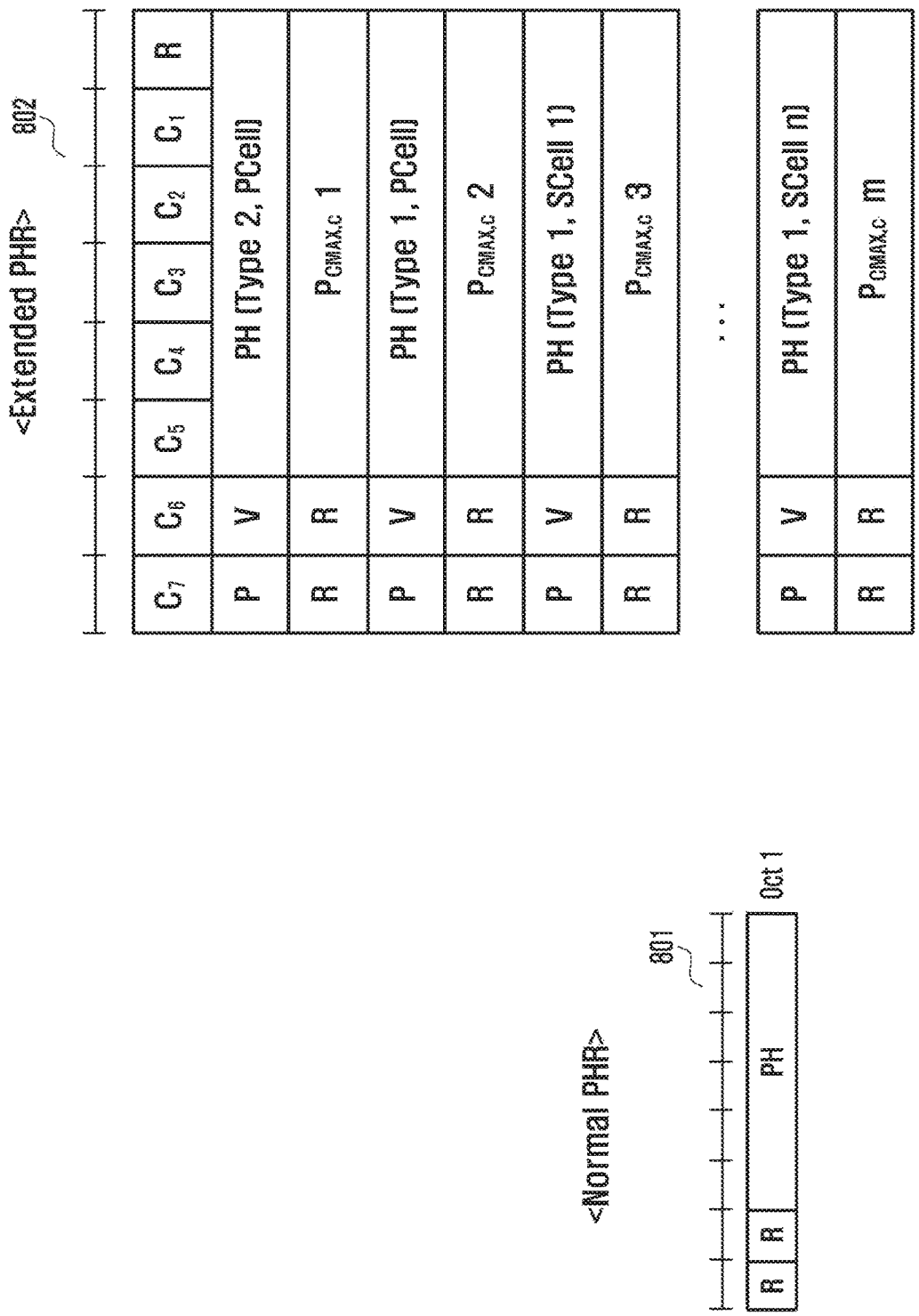
FIG. 8 is a view illustrating a PHR format according to an embodiment of the present invention.

FIG. 8 illustrates a Power Headroom Report (PHR) message format for reporting a UE transmission output margin to control the UE uplink transmission output. As illustrated in FIG. 8, a PHR format is divided into a normal PHR 801 and an extended PHR 802. The normal PHR format includes information on a transmission output margin of the UE with respect to a current serving cell. As a Carrier Aggregation (CA) function is added in LTE-A, the UE may simultaneously access one serving cell or up to a maximum of five serving cells and perform transmission/reception with the accessed serving cells. Accordingly, the PHR format 802, which is extended from the conventional format in which only PH level information on one cell is transmitted, is defined.

A first octet of the corresponding extended PHR 802 is used as a bitmap indicating the existence or nonexistence of the serving cell, and the next octet includes PH information required for type 2 transmission by a Primary Cell (PCell). Further, the following octet includes PH information required for type 1 transmission by the PCell. Type 2 includes PH level information in a case where the PUCCH and the PUSCH are simultaneously transmitted within the subframe. Type 1 includes PH level information on a case where only the PUSCH is transmitted. After PH information on the PCell is included, PH information on the Secondary Cell (SCell) designated to the first octet follow thereafter. In addition to each piece of PH information, a maximum output (PCmax), which can be transmitted within the cell, is also reported.

The cell based on the dynamic TDD configuration may require different uplink transmission outputs in the fixed frame and the dynamic frame as described above. Since the higher transmission output is used in the dynamic subframe compared to the fixed subframe, it is required to separately report the PH with respect to the fixed subframe and the dynamic subframe. Accordingly, embodiments of the present invention provide a method and an apparatus for reporting the PH for the fixed subframe and the PH for the dynamic subframe together. In order to report both the PH for the fixed subframe and the PH for the dynamic subframe, if there is a PHR trigger, PHR1 is transmitted to report the PH for the dynamic subframe and PHR2 is transmitted to report the PH for the fixed subframe according to an embodiment.

According to another embodiment, a new PHR format may be introduced. In the new PHR format, a PHR including both the PH for the fixed subframe and the PH for the dynamic subframe may be transmitted. The current PHR format does not allow reporting two PHs to the same serving cell. However, if a new PHR format which can report two PHs to the same serving cell is defined, the PH for the fixed subframe and the PH for the fixed subframe can be reported together. The new PHR format may be generated through a combination of two PHR formats. The new PHR format may be generated through a combination of two normal PHRs, the normal PHR and the extended PHR, or two extended PHRs.

The following description will be made mainly based on an embodiment in which PHR1 for reporting the PH for the dynamic subframe and PH2 for reporting the PH for the fixed subframe are transmitted together. However, the scope of the present invention is not limited thereto, and the technical idea of the present invention described in the following embodiment may be applied to the new PHR format.

The current PHR format does not allow reporting two PHs to the same serving cell. If the new PH format is introduced, UE complexity may increase. In order to define the new format to introduce the PH for the dynamic subframe, the new format for each of the normal format and the extended format should be defined, so that both the two formats should be newly defined. Accordingly, it is preferable to report the PH by reusing the conventional normal PHR format and the extended PHR format.

The following embodiment of the present invention will describe a method and an apparatus for simultaneously providing the PH for the fixed subframe and the PH for the dynamic subframe through the reuse of the conventional formats. To sum up, when the dynamic TDD operation is set, if the PHR is triggered, the UE transmits two PHRs. A Type 1 PH for the dynamic subframe is reported in the first PHR, and the PH for the fixed subframe is reported in the second PHR. A Type 2 PH is effective only for the fixed subframe. (As described in the "U" subframe configuration, the PUCCH is set only to the fixed subframe.)

Figure 9:
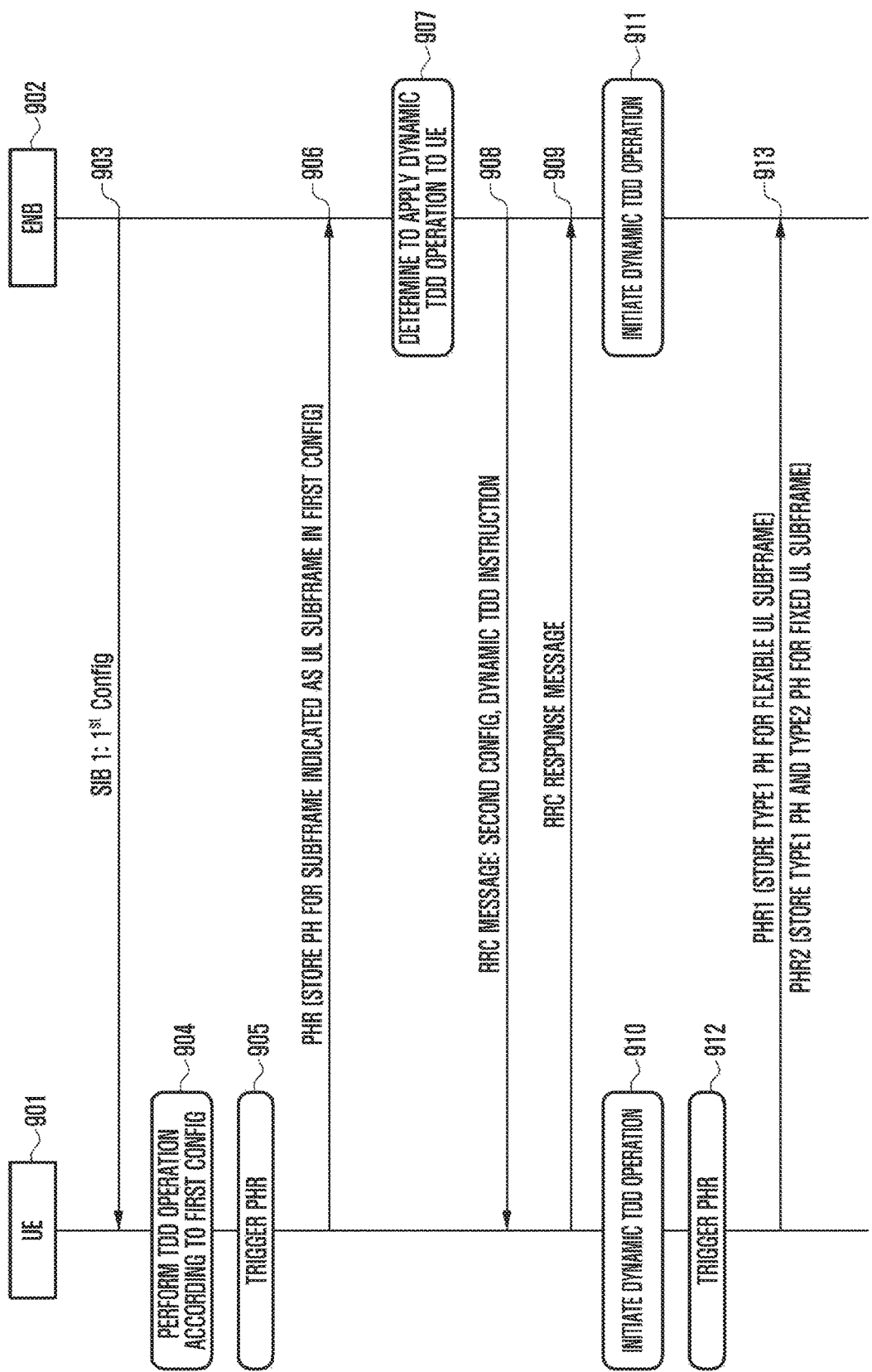
FIG. 9 is a view illustrating a PHR method based on a dynamic TDD configuration according to an embodiment of the present invention.

FIG. 9 illustrates a process for reporting PH information on the fixed subframe and the dynamic subframe in the dynamic TDD configuration cell according to an embodiment of the present invention. In step 903, a UE 901 receives system information (SIB1) from an ENB 902 and identifies Tdd-Config information. The corresponding Tdd-Config information is specified in TS 36.331 as follows.

```
TDD-Config ::∞           SEQUENCE {
   subframeAssignment       ENUMERATED {
                              sa0, sa1, sa2, sa3, sa4, sa5, sa6},
   specialSubframePatterns  ENUMERATED {
                              ssp0, ssp1, ssp2, ssp3, ssp4,ssps5,
                              ssp6, ssp7,
                              ssp8}
}
``` subframeAssignment refers to the TDD configuration information of FIG. 4 and may be set as one of the 7 configurations, and specialSubframePatterns refers to information on the "S" subframe pattern. The UE finishes the TDD configuration and performs an operation with the ENB according to the first configuration (step 903) in step 904. In step 905, the UE transmits the PHR to the ENB. At this time, an operation identical to that in the LTE system of the conventional TDD method is performed. PH information on the uplink subframe set as "U" in the TDD subframe configuration in the first configuration (903 step) may be reported to the ENB in accordance with the corresponding PHR format. Since the UE 901 should report the PH corresponding to Type2 according to whether the PUCCH and the PUSCH can be simultaneously transmitted in the corresponding uplink subframe, it is determined whether the PHR format becomes the normal PHR or the extended PHR.

Further, when the ENB 902 operates a plurality of serving cells and the current UE 901 operates CA through the plurality of serving cells, the UE 901 should report the PH to the ENB 902 by using the extended PHR format. The extended PHR format use method and the report method in CA are specified in 3GPP standard TS 36.321 in detail. The PHR process is achieved identically by the conventional UE and may be performed regardless of the dynamic TDD mode operation.

The UE 901 corresponds to a UE, which can operate according to the dynamic TDD configuration and step 908 corresponds to a step in which the current ENB cell 902 attempts the second TDD configuration for the dynamic TDD operation. In other words, the UE 901 is a UE, which can execute an eIMTA service, and may perform the second TDD configuration through an RRC configuration message from the ENB 902. As described above, through the second TDD configuration, the UE fixes the uplink subframe set as "U". In other words, the ENB 902 transmits an RRC configuration message to the UE 901 with respect to the uplink subframe to be fixedly used among the TDD configurations operated in the current serving cell. In step 909, the UE 901 transmits a response message to the ENB in response to the RRC message. The ENB 902 initiates the operation in the dynamic TDD mode from the moment when the response message is received. Further, the UE 901 initiates an operation in the dynamic TDD mode together with the transmission of the RRC response message.

In the dynamic TDD operation mode of steps 910 and 911, a process for re-configuring individual subframes to an uplink or downlink mode by using DCI transmitted in the PDCCH may be repeatedly executed according to a traffic pattern of the cell with respect to the remaining flexible (dynamic) subframes except for the "D" fixed downlink subframe designated through the first TDD configuration using SIB1 and the "U" fixed uplink subframe designated through the second TDD configuration using the RRC message. In step 912, the UE 901 starts transmitting the PHR to the ENB by the generation of the PHR trigger during the dynamic TDD mode operation. In step 913, the UE 901 stores and transmits two PHR MAC CEs for one MAC PDU, and the first PHR MAC CE (PHR1) stores the Type1 PH for the dynamic uplink subframe and the second PHR MAC CE (PHR2) stores the Type1 PH and the Type2 PH for the fixed uplink subframe.

The PHRs may be configured through different MAC CEs or configured through the conventional MAC CE. In the former case, a new MAC CE identifier may be used after defined and allocated to the PHR for the dynamic subframe and a new logical channel identifier should be allocated to the standard. In the latter case, the MAC CE identifier (or logical channel identifier) of the PHR, which is named and used in the current standard, is used and transmitted. In this case, it is understood that the PHR, which a receiver, that is, the ENB receives first, is for the dynamic subframe and the PHR, which the ENB receives next, is for the fixed subframe. To this end, the UE and the ENB should have a rule that is pre-arranged therebetween. However, there is an advantage of no need of a separate standard definition.

As described above that PHR1 is for the dynamic subframe, since the corresponding subframe does not include a PUCCH, only information on Type1 is needed in step 913. Accordingly, the UE may transmit the PHR to the ENB 902 by using the normal PHR format. However, when a plurality of serving cells of the ENB 902 operate with CA, the UE 901 should report PH information on active serving cells to the ENB 902 among currently operating serving cells.

In this case, the UE 901 transmits the report to the ENB 902 by using the extended PHR format. PHR2 of step 913 should include PH information on the fixed subframe. In this case, since the PUCCH and the PUSCH can be simultaneously transmitted, PH information on Type2 may be included. Accordingly, PHR2 uses the extended PHR format including both the Type1 PH and the Type2 PH. Further, as described above, when the UE 901 performs the CA operation for a plurality of serving cells, the extended PHR format including PHs of all of activated serving cells is used.

Figure 10:
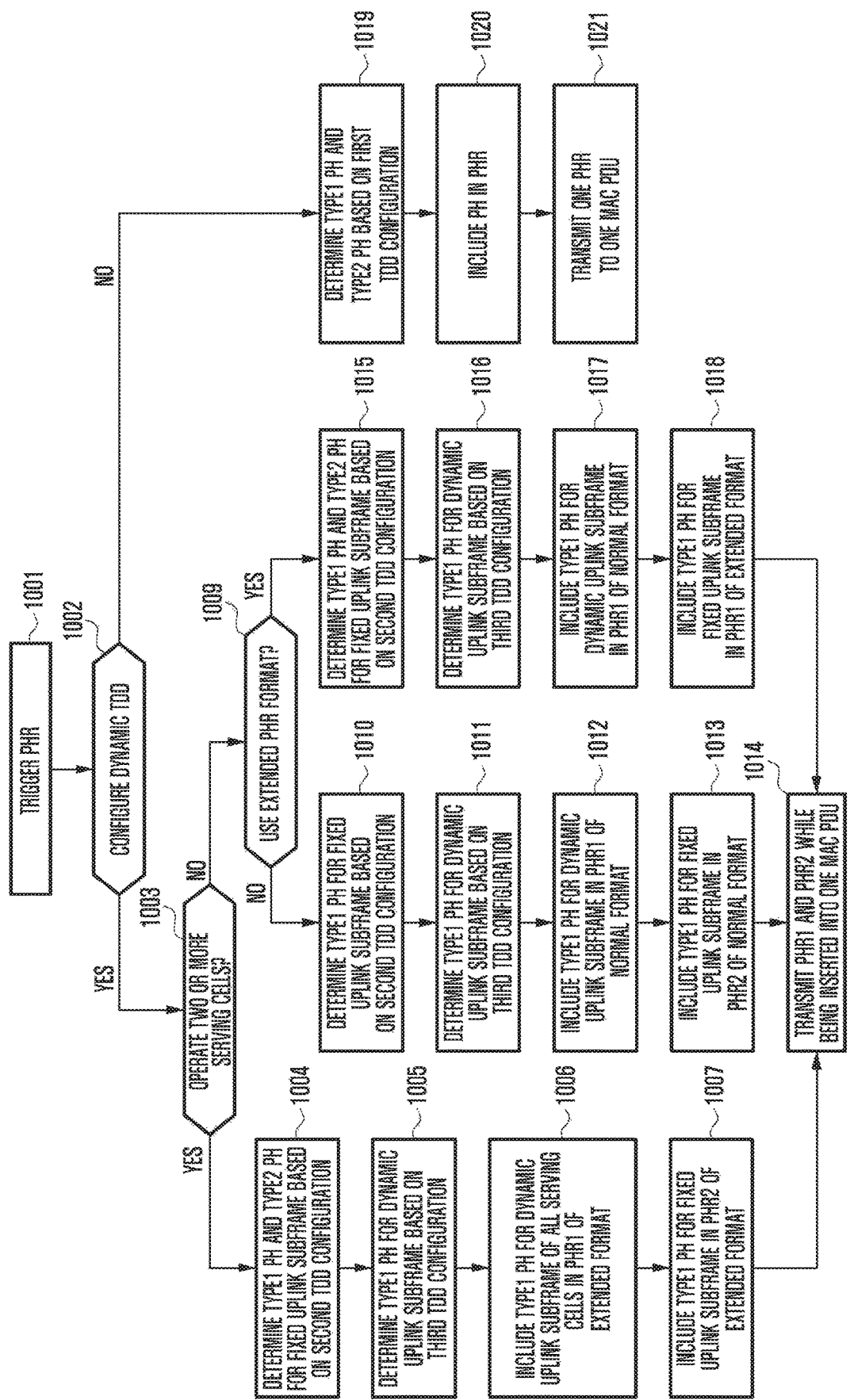
FIG. 10 is a flowchart illustrating a PHR operation of the UE according to the application of FIG. 9.

FIG. 10 is a flowchart illustrating the PHR report process for the fixed and dynamic subframes by the UE under the dynamic TDD configuration of FIG. 9.

In step 1001, when a PH report of the UE is triggered, it is required to determine whether the UE can operate in the dynamic TDD mode and is operating in the dynamic TDD mode. In step 1002, the dynamic TDD operation may refer to an operation for performing the third TDD configuration through a physical layer control signal (DCI), and, by the UE, receiving a Physical Downlink Shared CHannel (PDSCH) in any subframe with reference to the third TDD configuration and determining the subframe in which a Physical Uplink Shared CHannel (PUSCH) is transmitted. The dynamic TDD mode operation is initiated or stopped according to an instruction of the ENB.

In step 1003, the UE identifies whether two or more serving cells operate. When the UE operates with a plurality of serving cells of the ENB and CA, the UE should transmit PH information to the ENB by using the PHR extended format. When the UE operates in the dynamic TDD mode and with CA, the fixed uplink subframe is designated by the second TDD configuration using the RRC message in step 1004. A Type1 PH and a Type2 PH for the fixed uplink subframe are determined. At this time, the Type1 PH and the Type2 PH for the fixed uplink subframe may be determined based on the RRC message for configuring the TDD operation. The message for configuring the TDD operation may use new type system information (SIBx) as well as the RRC message. Meanwhile, when the second TDD configuration message (RRC or SIBx) is not received, the Type1 PH and the Type2 PH for the fixed uplink subframe may be determined based on the first TDD configuration message (SIB1). Such an application may be made in step 1009 and the following steps the flowchart of FIG. 10.

In step 1005, the UE determines the Type1 PH for the uplink subframe designated as the dynamic uplink subframe in the third TDD configuration by the DCI. Since the dynamic uplink subframe has no control uplink channel, the Type2 PH is not considered. The Type1 PH for the dynamic subframe may be determined based on the third TDD configuration by the DCI. However, when a new message for designating the dynamic subframe is applied, the Type1 PH for the dynamic subframe may be determined based on the new message. Further, when the third TDD configuration message is not received, the Type1 PH for the dynamic subframe may be determined based on the second TDD configuration message. For example, Type1 PH for the subframe, which is not determined as the fixed subframe, may be determined based on the first TDD configuration message and the second TDD configuration message. Such an application may be made in step 1009 and the following steps of FIG. 10.

In step 1006, the UE inserts the type1 PH for the dynamic subframe of all SCells in an active state into a predetermined sequenced PHR MAC CE, for example, a first PHR MAC CE (PHR1) by using the extended PHR format to operate current CA of the UE. In step 1007, the UE inserts PH information on the fixed uplink subframe into a predetermined sequenced PHR MAC CE, for example, a second PHR MAC CE (PHR2) by using the extended PHR format. PHR2 includes Type 1 for the fixed uplink subframe and PH information on Type2 in the extended PHR format. Further, PH information on all activated SCells is included in the corresponding extended PHR format.

In step 1014, corresponding PHR1 and PHR2 are inserted into one MAC PDU and then transmitted to the ENB.

In step 1009, the UE operates only with one PCell without a CA operation. The UE identifies whether the use of the extended PHR is instructed. The UE proceeds to step 1015 when the use of the extended PHR is instructed, and proceeds to step 1010 when the use of the extended PHR is not instructed. Whether to use the extended PHR is informed of to the UE by the ENB using predetermined control information.

According to an embodiment of the present invention, the ENB informs the UE of only one parameter indicating whether to use the extended PHR. The parameter indicates a format of the PHR MAC CE (PHR2) for the fixed uplink subframe, and the PHR MAC CE (PHR1) for the dynamic uplink subframe is determined by the UE itself according to the number of serving cells in which the dynamic TDD operation is configured. For example, when the number of serving cells in which the dynamic TDD operation is configured (or the number of serving cells in which the dynamic TDD operation is configured and which is currently in an active state) is one, the normal PHR format (indicated by reference numeral 801) is used. For example, when the number of serving cells in which the dynamic TDD operation is configured (or the number of serving cells in which the dynamic TDD operation is configured and which is currently in an active state) is two or more, the extended PHR format (indicated by reference numeral 802) is used.

A reason to separately signal the format of PHR2 is that, although only one cell is configured to the UE, when simultaneous transmission of the PUSCH and the PUCCH is configured to the UE, the use of the extended PHR format may be needed. When PHR1 uses the extended PHR format, the PHR MAC CE includes one bitmap octet, a plurality of Type1 PHs, and PCMAX as indicated by reference numeral 802. The UE may insert the dynamic subframe PH of the serving cell which is currently in an active state and in which the dynamic TDD is configured into PHR1 of the extended PHR format sequentially according to the order of a serving cell index of the corresponding serving cell.

UE proceeding to step 1010 means that CA is not configured to the UE, and the UE determines the Type1 PH for the subframe specified as the fixed uplink subframe in the second TDD configuration. In step 1011, the UE determines the Type1 PH for the dynamic uplink subframe determined by the DCI (determined by the third TDD configuration). In step 1012, the UE includes Type1 PH information on the corresponding dynamic uplink subframe by using the normal PHR format in order to make PHR1 for the dynamic uplink subframe. In step 1013, the UE uses the normal PHR format including the Type1 PH in order to make PHR2 for the fixed uplink subframe. In step 1014, the UE inserts PHR1 and PHR2 MAC CEs into one MAC PDU and then transmits the MAC PDU to the ENB as described above.

The UE proceeding to step 1015 means that the use of the extended PHR format for PHR2 is instructed and only one serving cell is configured, and the UE acquires PH information corresponding to Type1 and Type2 for the fixed uplink subframe specified by the second TDD configuration. In step 1016, the UE determines Type1 PH information on the dynamic uplink subframe specified by the third TDD configuration specified by the DCI. In step 1017, the UE generates PHR1, that is, the content of the Type1 PH for the dynamic uplink subframe by using the normal PHR format. In step 1018, the UE makes a PHR2 report by using the extended PHR format including Type1 and Type2 for the fixed uplink subframe. The two PHR1 and PHR2 are separated MAC CEs, and are carried on one MAC PDU and transmitted to the ENB in step 1014.

In step 1019, the UE does not operate in the dynamic TDD mode. In this case, Type1 PH and Type2 PHE information for all uplink subframes configured according to the first TDD configuration included in the system information SIM transmitted by the ENB is transmitted to the ENB. When the UE operates CA, the UE transmits PH information on the activated SCell by using the extended PHR format in step 1021 and, otherwise, transmits PH information on the activated SCell by using the normal PHR format in step 1021. In step 1021, only one PHR MAC CE is included in one MAC PDU.

Hereinafter, an operation for determining the PH for the dynamic uplink subframe and determining the PH for the fixed uplink subframe will be described in more detail.

The PH corresponds to a particular subframe one to one. For example, the HP of subframe (i) is defined as follows.

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$$

The MAC PDU storing PHR1 and PHR2 is transmitted to subframe (i). At this time, if subframe (i) is the fixed uplink subframe, PHR2 stores PHtype1,c(i) (that is, the PH for subframe (i)) and PHR1 stores PHtype1,c(i+x). (i+x) specifies a dynamic subframe which is closest to (i) temporally. PHtype1,c(i+x)_flex, which is the dynamic uplink subframe PH for subframe (i+x) is calculated as follows.

$$PH_{type1,c}(i+x)\_flex = P_{CMAX,c}(i+x) - \{10 \log_{10}(M_{PUSCH,c}(i+x)) + P_{O\_PUSCH,c}(j)\_flex + \alpha_c(j)\_flex \cdot PL_c + TF,c(i+x) + f_c(i+x)\_flex\}$$

$P_{CMAX,c}(i+x)$ is $P_{CMAX,c}$ for subframe (i+x). It is assumed that the same transmission resources in subframe (i) are allocated to subframe (i+x), and the UE determines $P_{CMAX,c}(i+x)$ after determining MPR, A-MPR, P-MPR, and ΔTc. Descriptions of the parameters and a method of determining $P_{CMAX,c}$ follows the standard 36.101. Alternatively, $P_{CMAX,c}$, which is calculated when particular values shared between the UE and the ENB, for example, MPR, A-MPR, P-MPR, and ΔTc are configured as "0", is used for $P_{CMAX,c}(i+x)$.

$M_{PUSCH,c}(i+x)$ and ΔTF,c(i+x) may use values determined when it is assumed that the same transmission resources of subframe (i) are allocated to subframe (i+x). Alternatively, $M_{PUSCH,c}(i+x)$ and ΔTF,c(i+x) may use values determined based on transmission resource allocation, for example, when it is assumed that the lowest MCS level and one transmission resource block are allocated.

$P_{O\_PUSCH,c}(j)\_flex$ is separately configured for the dynamic uplink subframe, and uses $P_{O\_PUSCH,c}$ indicated from the ENB.

$\alpha_c(j)\_flex$ is separately configured for the dynamic uplink subframe and uses ac indicated from the ENB.

fc (i+x)_flex is determined by applying a predetermined correction value to fc (i)_flex which is an accumulated value of TPCs for the dynamic uplink subframe. The correction value may be a predetermined positive value when fc (i)_flex is a positive value and may be a predetermined negative value when fc (i)_flex is a negative value. When the dynamic TDD is configured, fc (i)_flex is initiated to 0 or a predetermined value. The predetermined value may be, for example, fc (i) used before the dynamic TDD is configured.

When subframe (i) in which the MAC PDU storing PHR1 and PHR2 is the dynamic uplink subframe, PHR1 stores $PH_{type1,c}(i)\_flex$ and PHR2 stores $PH_{type1,c}(i+y)$. (i+y) specifies a dynamic subframe which is closest to (i) temporally. PHtype1,c(i+y)_fix, which is the fixed uplink subframe PH for subframe (i+y) is calculated as follows.

$$PH_{type1,c}(i+y)\_fix = P_{CMAX,c}(i+y) - \{10 \log_{10}(M_{PUSCH,c}(i+y)) + P_{O\_PUSCH,c}(j)\_fix + \alpha_c(j)\_fix \cdot PL_c + \Delta_{TF,c}(i+y) + f_c(i+y)\_fix\}$$

$P_{CMAX,c}(i+y)$ is $P_{CMAX,c}$ for subframe (i+y). It is assumed that the same transmission resources in subframe (i) are allocated to subframe (i+y), and the UE determines $P_{CMAX,c}(i+y)$ after determining MPR, A-MPR, P-MPR, and DTC. Alternatively, $P_{CMAX,c}$, which is calculated when particular values shared between the UE and the ENB, for example, MPR, A-MPR, P-MPR, and ΔTc are configured as "0", is used for $P_{CMAX,c}(i+y)$.

$M_{PUSCH,c}(i+y)$ and ΔTF, c(i+y) may use values determined when it is assumed that the same transmission resources of subframe (i) are allocated to subframe (i+y). Alternatively, $M_{PUSCH,c}(i+y)$ and ΔTF, c(i+y) may use values determined based on transmission resource allocation, for example, when it is assumed that the lowest MCS level and one transmission resource block are allocated.

PO_PUSCH,c(j)_fix is separately configured for the fixed uplink subframe, and uses PO_PUSCH,c indicated from the ENB. The UE uses PO_PUSCH,c, which is used before the dynamic TDD is configured, for PO_PUSCH,c(j)_fix.

$\alpha_c$ (j)_fix is separately configured for the fixed uplink subframe and uses ac is indicated from the ENB. The UE may use ac is, which is used before the dynamic TDD is configured, for αc_fix.

fc (i+y)_fix is determined by applying a predetermined correction value to fc (i)_fix which is an accumulated value of TPCs for the dynamic uplink subframe. The correction value may be a predetermined positive value when fc (i)_fix is a positive value and may be a predetermined negative value when fc (i)_fix is a negative value. When the dynamic TDD is configured, fc (i)_fix is initiated to fc(i) of a corresponding time point.

According to a second embodiment, a method of effectively using HARQ when serving cells using the dynamic TDD mode are used will be described.

Figure 11:
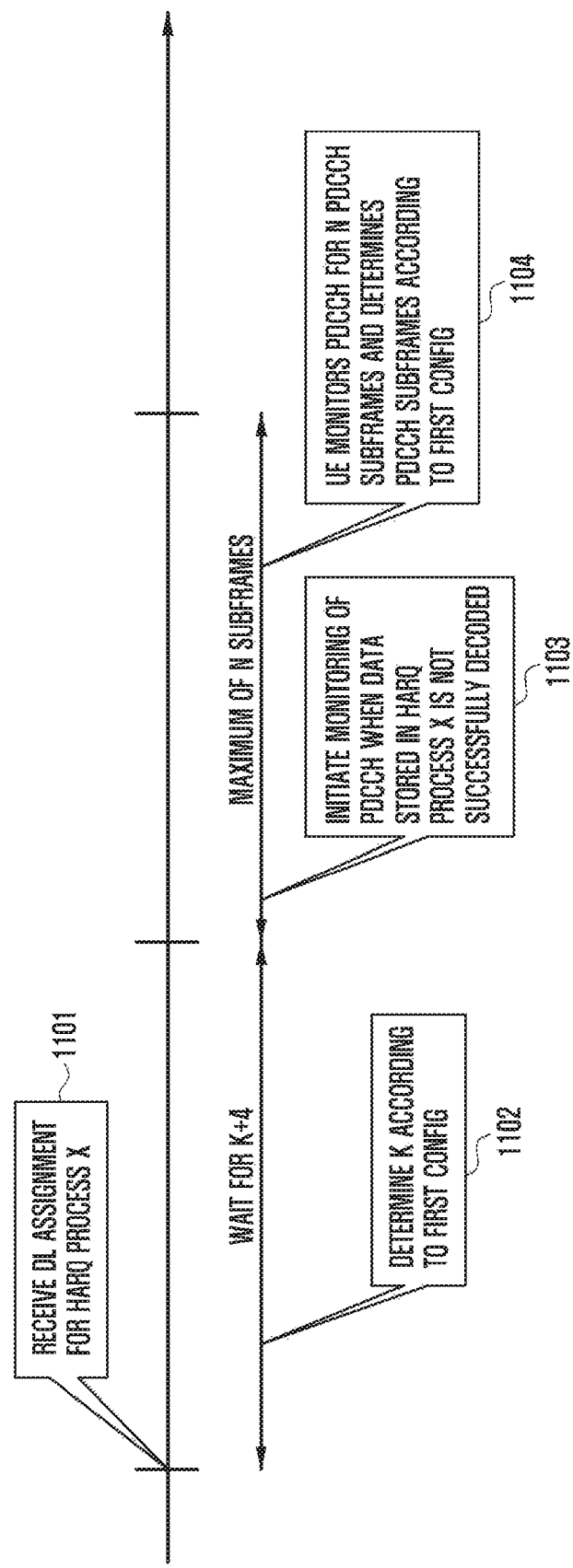
FIG. 11 is a view illustrating an HARQ operation based on a static TDD configuration according to an embodiment of the present invention.

FIG. 11 illustrates an example of a UE operation type according to the HARQ in the conventional TDD mode. When the TDD mode is used, a value of the HARQ Round Trip Timer (HARQ RTT) is differently configured and applied according to the TDD configuration used by configured cells. When the PDSCH is received, the UE determines the value of the HARQ RTT timer and drives the HARQ RTT timer. The UE configures the HARQ RTT timer by 8 subframes when the UE operates with FDD, and configures the HARQ RTT timer by k+4 subframes when the UE operates with TDD. Here, k refers to a value between downlink data transmission and transmission of the corresponding HARQ feedback, and is defined according to the TDD configuration value. Later, when the HARQ RTT timer expires and data, which is not successfully decoded, is stored in a related HARQ buffer, the UE drives a drx-RetransmissionTimer and continuously monitors the PDCCH. According to the present invention, when the k value is configured, the most proper dynamic TDD is configured in consideration of whether the dynamic TDD configuration is performed.

In FIG. 11, the UE receives data from the ENB through the PDSCH in step 1101. The data transmitted through the corresponding downlink data channel (PDSCH) is allocated to a particular HARQ processor. At this time, since it is assumed that all cells use TDD, the HARQ RTT Timer is set by k+4 subframes in step 1102. The value of the HARQ RTT timer refers to a minimum time until data is re-transmitted, and the UE may not be activated while the HARQ RTT timer is driven. Meanwhile, k refers to an interval between data transmitted through downlink in TDD and feedback of the data, and is inserted into the first TDD configuration, that is, the system information SIB1 and broadcasted by the ENB. A k value is defined as a table below. A reason of the definition is that locations of the uplink subframe, the downlink subframe, and the special subframe become different according to the TDD configuration values from 0 to 6 and, accordingly, a location where data can be transmitted through downlink and a location where a feedback value of the data can be transmitted through uplink become different.

TABLE a value of k according to TDD configuration

| UL-DL Configuration | Subframe n | | | | | | | | | |
|---|---|---|---|---|---|---|---|---|---|---|
|  | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The UE drives the HARQ RTT timer according to the configured value and may transmit feedback informing of whether the data is properly received through the uplink control channel according to the received value. Thereafter, when the HARQ RTT timer expires and the reception of the downlink data fails in step 1103, the UE drives the drx-RetransmissionTimer to receive the re-transmission. Accordingly, the UE is in an activated time, and continuously monitors the PDCCH subframe to receive the re-transmitted data from the ENB.

At this time, the UE monitors a maximum of n PDCCH subframes. The PDCCH subframe is determined according to the configuration of SIB1 for the first TDD configuration in step 1104. The PDCCH subframe corresponds to a subframe to which the PDCCH is configured and includes the downlink subframe and the S subframe.

Figure 12:
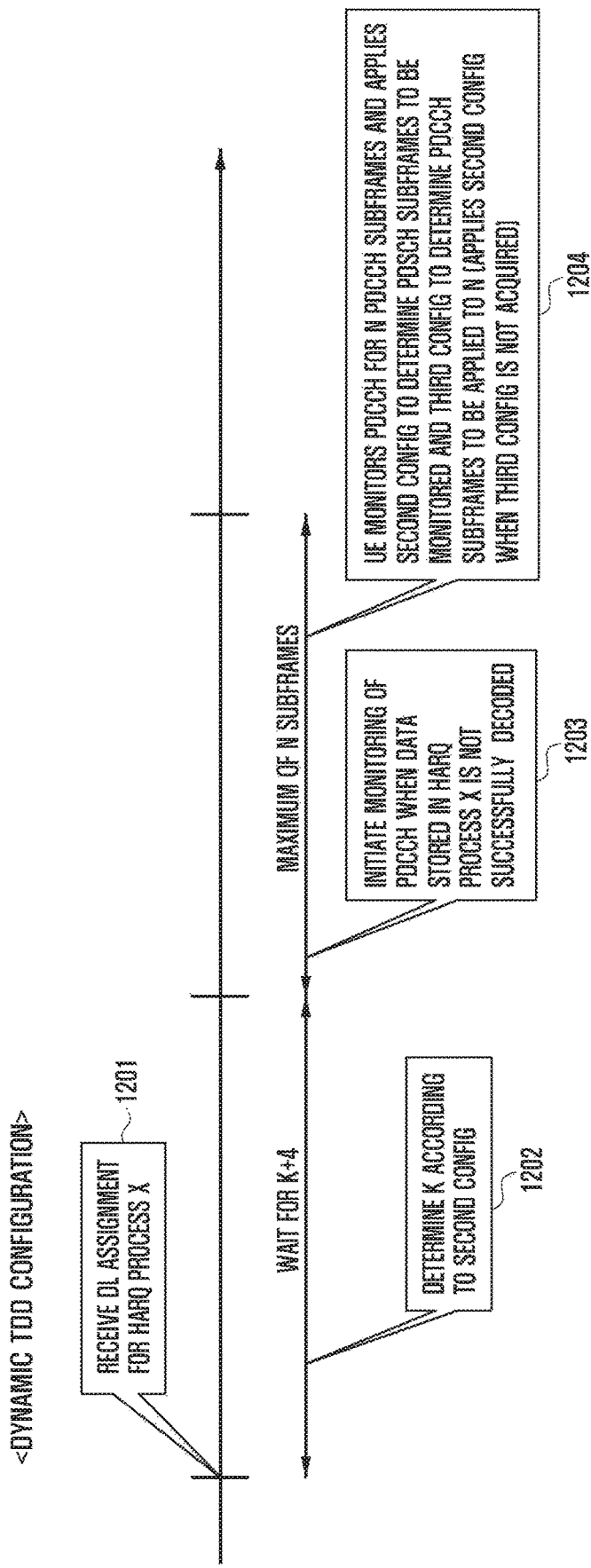
FIG. 12 is a view illustrating an HARQ operation based on a dynamic TDD configuration according to an embodiment of the present invention.

FIG. 12 illustrates an HARQ operation of the UE in the cell operating in the dynamic TDD mode according to an embodiment of the present invention.

In step 1201, the UE receives downlink data, allocates the corresponding data to a particular HARQ processor, and configures the HARQ RTT timer to wait for k+4. A k value may be determined according to the above table based on the second TDD configuration by the RRC message in step 1202. The second TDD configuration may be used for the purpose of determining the fixed uplink subframe or determining the size of a forward HARQ soft buffer. A method of determining the size of the HARQ soft buffer follows section 7.1.8 of the standard 36.213.

The size of the HARQ soft buffer is determined according to the size of total buffers and the number of downlink HARQ processors, and the second TDD configuration specifies the number of HARQ processors. Accordingly, when the UE performing the dynamic TDD configuration determines k, k is specified through another TDD configuration indicated through system information or the RRC control message rather than the TDD configuration dynamically changing through DCI. The second TDD configuration may include the RRC control message or new type system information (SIBx). Further, when the UE performing the dynamic TDD configuration determines k, if the UE does not receive the second TDD configuration, k may be determined based on the first TDD configuration (for example, based on SIB1).

In step 1203, when the HARQ RTT timer expires, if data stored in the HARQ processor is not successfully decoded, the UE should continuously monitor the PDCCH. At this time, the UE monitors the PDCCH for a maximum of n subframes. Alternatively, the UE drives the retransmission timer having the value of n and monitors the PDCCH while the timer is driven. The timer decreases by 1 whenever a predetermined subframe lapses, and a subframe considered for the driving of the timer is a subframe specified as the PDCCH subframe by the second TDD configuration.

For example, when n is 5, the second TDD configuration is TDD configuration 4, and the HARQ RTT timer expires at subframe 0, if 5 subframes lapse among the subframes (that is, subframes 0, 1, 4, 5, 6, 7, 8, and 9) indicated by the PDCCH subframes in TDD configuration 4 (that is, in subframe 7), the UE stops the timer and ends the monitoring of the PDCCH.

Meanwhile, the UE monitors the PDCCH of the subframe indicated by the PDCCH subframe in the third TDD configuration while the timer is driven. In the above example, when the third TDD configuration is TDD configuration 0, the UE monitors the PDCCH in subframes 1, 5, and 6 specified as the downlink subframe or the S subframe in TDD configuration 0 among the subframes between subframe 1 and subframe 7. When the UE does not know the third TDD configuration at the time point when the HARQ RTT timer expires, the UE may determine the subframe in which the PDCCH is monitored through the application of the second TDD configuration. The third TDD configuration may be configuration information included in DCI. The L1 signal message (that is, eIMTA command) such at the DCI may be transmitted to the UE every 10, 20, 40, or 80 ms as described above, and the UE for the corresponding message may be identified by a UE radio identifier (C-RNTI).

The ENB may transmit the L1 signal message to the UE in a particular subframe of the last radio frame on the period. The corresponding subframe may be informed of to the UE in a bitmap form by the ENB using an RRC higher layer message. At this time, the corresponding bitmap follows tdd-config designated by SIB1. When tdd-config is 0, subframes 0, 1, 5, and 6 can receive the L1 signal, so that the RRC informs the UE of a total of 4-bit map information. When the bitmap corresponds to 1001, the UE can receive the L1 command through subframes 0 and 6. Accordingly, a length of the corresponding bitmap may be determined according to tdd-config of SIB1.

A maximum length may be 9 when tdd-config is 5, but may be 10 in a case of the PCell operating with FDD. It is because downlink transmission can be performed in the whole subframes in FDD. Further, when the ENB desires to configure only a particular subframe among the subframes in which the downlink transmission can be performed without transmitting the RRC message based on the maximum bitmap length of 9 or 10, the maximum bit length is not needed, so that the ENB may transfer the n-bit map corresponding to the maximum length of the subframe, which the ENB desires to mainly configure, to the UE. In this case, a start downlink subframe of the corresponding bitmap should be defined. In the above example, when SIB1 designate tdd-config as 0 and the RRC give 2 bits to the bitmap rather than 4 bits, if the corresponding bitmap is applied to a fifth subframe of every radio frame, the corresponding bitmap corresponds to subframes 5 and 6. At this time, when the bitmap is configured as "01", the UE may receive the L1 signal message only in a sixth subframe.

The UE may periodically receive the message from the ENB, but may not receive the corresponding command. When the UE does not receive the L1 signal continuously transmitted in a particular subframe every 40 msec, the UE determines that reception of the L1 command fails.

Figure 13:
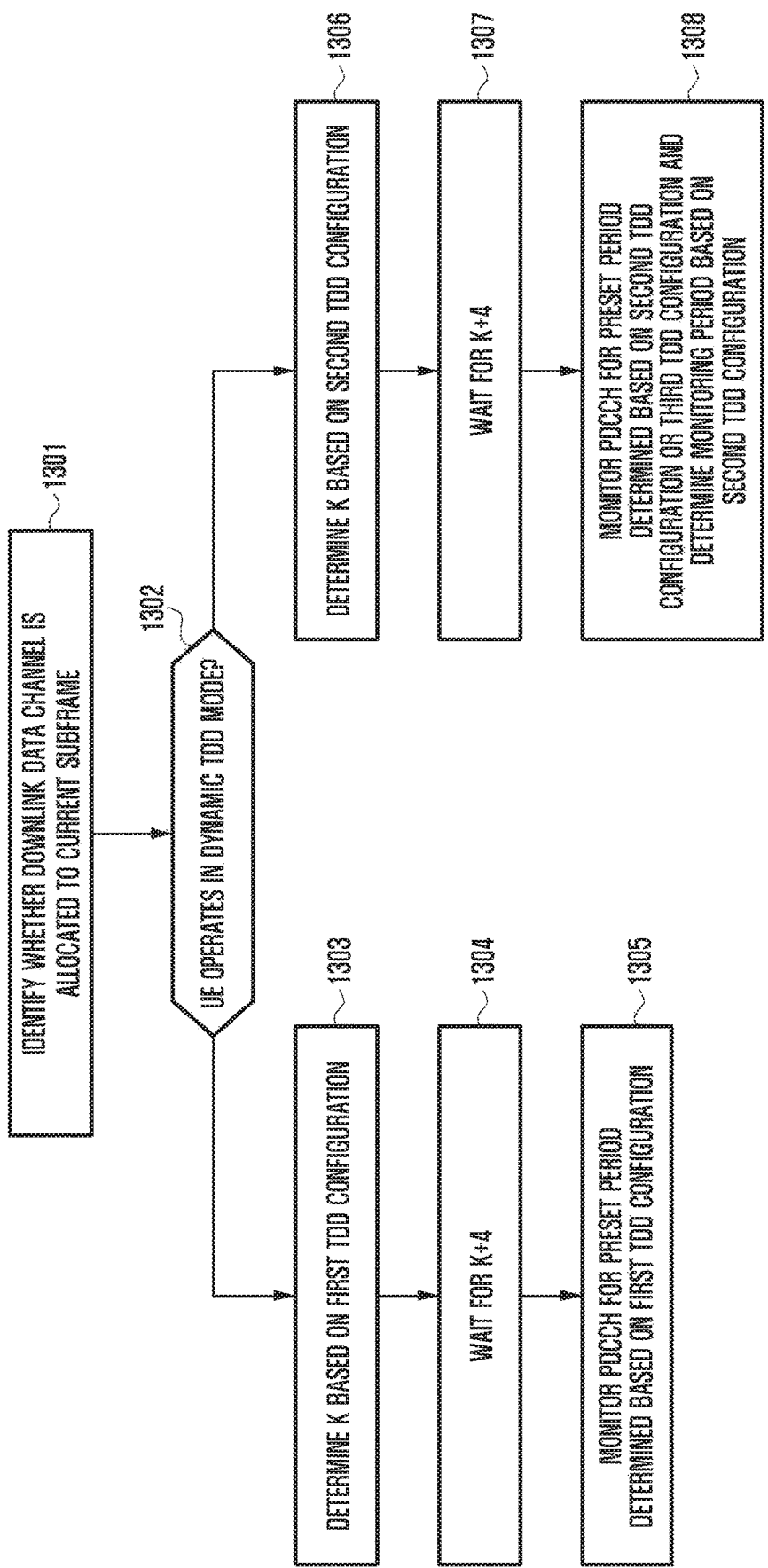
FIG. 13 is a flowchart illustrating an HARQ operation of the UE according to the application of FIG. 12.

FIG. 13 is a flowchart illustrating an operation of the UE for the HARQ process according to the dynamic TDD operation of FIG. 12. In step 1301 the UE identifies whether a downlink data channel is allocated to the current subframes through a downlink control channel (PDCCH). In step 1302, the UE identifies whether the UE currently operates in the dynamic TDD mode. When the UE does not operate in the dynamic TDD mode, the UE operates like in the conventional static TDD mode. The UE which does not operate in the conventional dynamic TDD mode selects a k value according to the TDD configuration included in the system information SIB1 in step 1303.

The UE waits for k+4 after receiving the downlink data in step 1304. When decoding of the corresponding data fails, the UE should monitor the PDCCH to receive re-transmission for n subframes in step 1305. At this time, then subframes may be determined by counting subframes configured as the downlink subframes and the S subframes according to the TDD configuration designated in the system information. Further, the PDCCH is monitored in the subframes configured as the downlink subframes and the S subframes according to the TDD configuration designated in the system information.

When the UE supports and operates in the dynamic TDD mode, the k value is determined according to the second TDD configuration in step 1306. The UE waits for k+4 according to the second TDD mode. When the decoding of the corresponding received data fails, the UE monitors the PDCCH to receive data re-transmitted by the ENB in step 1308. At this time, the n countings may be performed only in subframes specified as PDCCH subframes in the second TDD configuration and the PDCCH is received in the subframes indicated as PDCCH subframes by the third TDD configuration for a period specified by the n subframes to determine whether to perform scheduling. When the UE does not know the third TDD configuration at a time point when the HARQ RTT timer expires, the UE receives the PDCCH in subframes indicated as PDCCH subframes based on the second TDD configuration and determines whether the scheduling is performed. In other words, when the dynamic TDD is not configured, the UE determines a length of the HARQ RTT timer, an actual length of an time interval defined by the re-transmission timer (for example, when the timer corresponds to n, the subframe to be included in n), and the subframe to receive the PDCCH while the re-transmission timer is driven based on the application of the first TDD configuration.

When the dynamic TDD is configured, the UE determines a length of the HARQ RTT timer and an actual length of a time interval defined by the re-transmission timer based on the application of the second TDD configuration, and determines the PDCCH subframe while the re-transmission timer is driven based on the application of the third TDD configuration.

Figure 14:
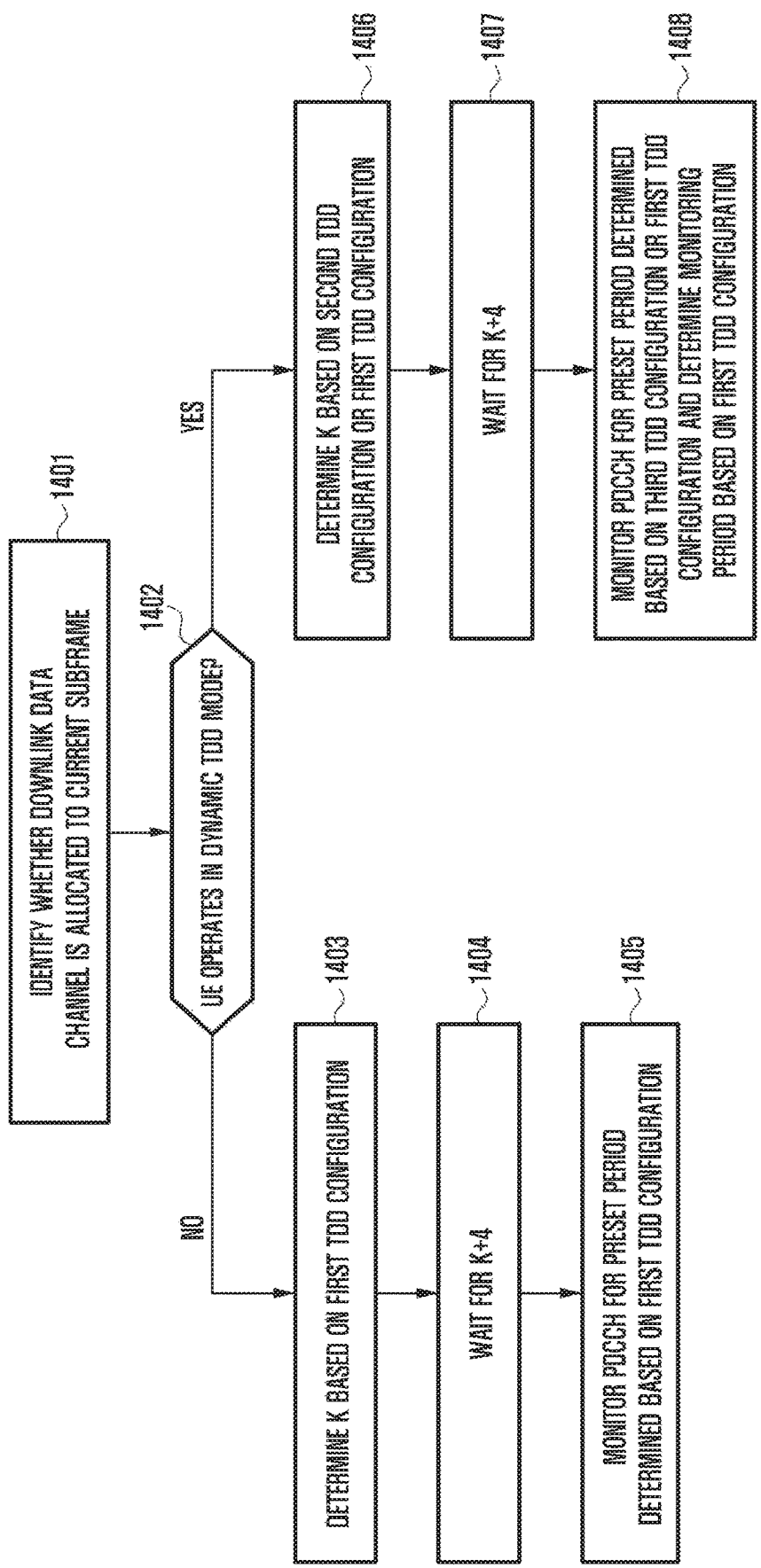
FIG. 14 is a flowchart illustrating an operation of the UE corresponding to another embodiment of the embodiment of the present invention described in FIG. 12.

FIG. 14 is a flowchart illustrating an operation of the UE corresponding to another embodiment of the embodiment of the present invention described in FIG. 12.

Referring to FIG. 14, when the downlink control channel PDCCH indicates that the corresponding subframe operates for downlink transmission or downlink transmission is allocated to the corresponding subframe in step 1401, the operation of the corresponding UE varies depending on whether the dynamic TDD configuration is performed or not in step 1402.

When the corresponding UE does not operate in the dynamic TDD mode, the UE may operate like in the conventional static TDD mode. The UE which does not operate in the conventional dynamic TDD mode selects a k value according to the TDD configuration included in the system information SIB1 in step 1403. The UE waits for k+4 after receiving downlink data in step 1404. When decoding of the corresponding data fails, the PDCCH should be monitored to receive re-transmission for n subframes in step 1405. At this time, the n subframes may be determined by counting subframes configured as the downlink subframes and the S subframes according to the TDD configuration designated in the system information. Further, the PDCCH is monitored in the subframes configured as the downlink subframes and the S subframes according to the TDD configuration designated in the system information.

When the corresponding UE operates in the dynamic TDD mode, the UE proceeds to step 1406. When the corresponding UE configures the dynamic TDD mode through the RRC control message and operates in the dynamic TDD modes, the corresponding UE may receive an L1 signal message (eIMTA command) and operate or may not receive the L1 signal message. The k value may be determined based on the current dynamic TDD configuration according to whether the L1 signal message (third TDD configuration message or 3rd Config) is received, or, when the command is not received, the k value may be determined based on the TDD configuration designated in the system information (SIB1) in step 1406. That is, the k value may be determined according to the corresponding TDD configuration when the L1 signal is received, and the k value may be determined according to the system information when the L1 signal is not received.

Then, the UE waits for a subframe period corresponding to k+4 in step 1407. When the decoding of the corresponding data fails, the downlink control channel (PDCCH) is monitored for a predetermined period to receive retransmission for n subframes in step 1408. At this time, identically to the above, when the L1 signal message is received, the monitoring is performed according to the TDD configuration of the corresponding message. Otherwise, the downlink control channel is monitored in the downlink subframe according to the TDD configuration designated in SIB1.

At this time, the downlink control channel may be monitored for an n period designated by a higher layer in advance based on the downlink subframe designated by the TDD configuration of SIB1. The downlink control channel may be monitored for a predetermined period based on the downlink subframe designated by the TDD configuration of SIB1 regardless of whether the L1 signal message is received.

When the predetermined monitoring period corresponds to 8 subframes, the number of downlink subframes of the TDD configuration designated by SIB1 is counted and the corresponding subframes are monitored eight times. Accordingly, since the number of downlink subframes of the TDD configuration of SIB1 is larger than or equal to the number of downlink subframes of the TDD configuration designated by the L1 signal, the number of PDCCH subframes, which are actually monitored for the n period, may be larger or equal according to whether the reception of the L1 signal is succeeded. When the TDD configuration is not performed, the UE waits for a k+4 period according to the TDD configuration designated by SIB1 and then monitors the downlink control channel in downlink subframes corresponding to the number designated according to the TDD configuration of SIB1.

FIG. 15 is a block diagram illustrating an internal structure of the UE according to an embodiment of the present invention.

The UE transmits/receives data to/from a higher layer device 1510 and transmits/receives control messages through a control message processor 1515. When the UE transmits a control signal or data to the ENB, the UE multiplexes the control signal or the data through a multiplexing device 1505 and then transmits the same through a transmitter 1500 under a control of a controller 1520.

In contrast, when the UE receives a physical signal, the UE receives the physical signal through a receiver 1500, de-multiplexes the received signal through a de-multiplexing device 1505, and transfers the de-multiplexed signal to the higher layer device 1510 or the control message processor 1515 under the control of the controller 1520.

The controller 1520 may control a general operation of the UE. According to an embodiment of the present invention, when a PHR is triggered in the UE, the controller 1520 may determine whether the UE operates in a dynamic time division multiple access (Time Division Duplexer: TDD) mode. When the UE operates in the dynamic TDD mode, the controller 1520 may make a control to transmit a first PHR for a dynamic subframe and a second PHR for a fixed subframe to the ENB. At this time, the first PHR and the second PHR may be stored in one MAC PDU and then transmitted. The first PHR may include a first type PH indicating PH level information on a case where only the uplink data channel (Physical Uplink Shared Channel: PUSCH) is transmitted, and the second PHR may include PH level information on the subframe in which the uplink control channel (Physical Uplink Control CHannel: PUCCH) and the PUSCH are simultaneously transmitted.

The controller 1520 may make a control to determine the first type PH and the second type PH for the fixed subframe based on a Radio Resource Control (RRC) message received from the ENB for the TDD operation configuration and to determine the first type PH for the dynamic subframe based on Downlink Control Information (DCI) received from the ENB for the dynamic TDD subframe configuration.

The controller 1520 may make a control to determine whether the UE receives a service from a plurality of serving cells. When the UE receives the service from the plurality of serving cells, the controller 1520 may make a control to store the first PHR and the second PHR by using the PHR extended format.

When it is determined that the UE operates in the dynamic TDD mode and receives the service from one serving cell, the controller 1520 may make a control to determine whether the UE uses the PHR extended format, and, when the UE does not use the PHR extended format, to store the first type PH for the fixed subframe determined based on the RRC message for the TDD operation configuration by using the PHR normal format and to store the first type PH for the dynamic subframe determined based on the DCI for the dynamic TDD subframe configuration by using the PHR normal format.

The controller 1520 may make a control to store the first type PH and the second type PH for the fixed subframe determined based on the RRC message received from the ENB for the TDD operation configuration by using the PHR extended format and to store the first type PH for the dynamic subframe determined based on the DCI received from the ENB for the dynamic TDD subframe configuration by using the PHR normal format.

When the UE does not operate in the dynamic TDD mode, the controller 1520 may make a control to transmit the PHR including the first type PH and the second type PH for the uplink subframe to the ENB based on the TDD configuration information included in the system information transmitted by the ENB.

The controller 1520 may make a control to allocate a downlink data channel, which is received from the ENB, to an HARQ processor and, when the UE operates in the dynamic time division multiple access (Time Division Duplexer: TDD) mode, to configure an HARQ Round Trip Time (RTT) timer based on the TDD configuration RRC message received from the ENB and to transmit information indicating a decoding result of the data allocated to the HARQ processor to the ENB for an HARQ RTT timer interval.

The controller 1520 may make a control to determine whether the DCI for the dynamic TDD configuration is received from the ENB and, when the DCI is not received, to configure the HARQ RTT timer based on SIB1 received from the ENB.

When it is determined that the allocated data channel is not decoded, after the HARQ RTT timer expires, the controller 1520 may make a control to determine a monitoring period based on the RRC message and to determine the subframe to be monitored based on the DCI for the dynamic TDD configuration.

When the DCI is not received at a time point when the HARQ RTT timer expires, the controller 1520 may make a control to determine the subframe to be monitored based on SIM received from the ENB.

When the RRC message is not received from the ENB, the controller 1520 may make a control to configure the HARQ RTT timer based on SIB1 received from the ENB.

When it is determined that the allocated data channel is not decoded, after the HARQ RTT timer ends, the controller 1520 may make a control to determine a monitoring period based on the RRC message and to determine the subframe to be monitored based on the DCI for the dynamic TDD configuration.

When the DCI is not received at a time point when the HARQ RTT timer expires, the controller 1520 may make a control to determine the subframe to be monitored based on the RRC message.

Meanwhile, the block diagram illustrating each component by using a block is only for convenience of the description, and the present invention is not limited thereto. For example, it is apparent that the operation performed by each unit may be performed under a control of the controller 1520. Further, it is apparent that the UE of FIG. 15 may perform the first embodiment and the second embodiment of the present invention. In addition, the controller 1520 may control the operation of the UE described in FIGS. 1 to 14.

Figure 16:
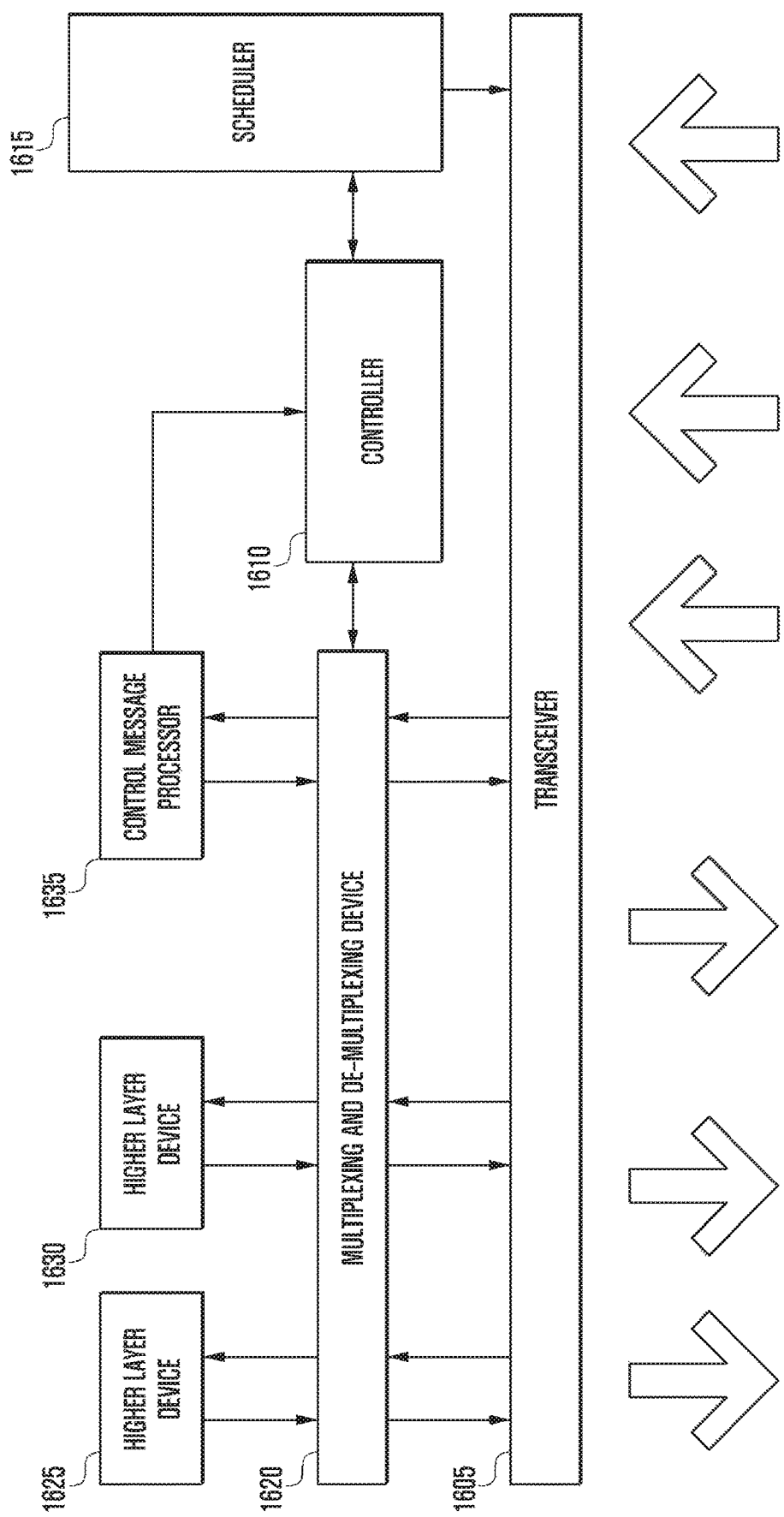
FIG. 16 is a block diagram illustrating an ENB according to an embodiment of the present invention.

FIG. 16 is a block diagram illustrating a configuration of the ENB according to an embodiment of the present invention. The ENB apparatus of FIG. 16 may include a transceiver 1605, a controller 1610, a multiplexing and de-multiplexing unit 1620, a control message processor 1635, higher layer processors 1625 and 1630, and a scheduler 1615.

The transceiver 1605 transmits data and a predetermined control signal through a forward carrier and receives data and a predetermined control signal through a backward carrier. When a plurality of carriers is set, the transceiver 1605 transmits and receives data and a control signal through the plurality of carriers. The multiplexing and de-multiplexing unit 1620 multiplexes data generated by the higher layer processors 1625 and 1630 or the control message processor 1635 or de-multiplexes data received from the transceiver 1605 to transfer the data to the appropriate higher layer processors 1625 and 1630, the control message processor 1635, or the controller 1610. The controller 1610 determines whether to apply the dynamic TDD configuration to a specific UE and determines whether to include the configuration information in an RRC connection re-configuration (RRCConnectionReconfiguration) message.

The control message processor 1635 receives an instruction from the controller, generates the RCConnectionReconfiguration to be transmitted to the UE, and transmits it to a lower layer.

The higher layer processors 1625 and 1630 may be configured for each service of each UE. The higher layer processors 1625 and 1630 process data generated by a user service such as FTP or VoIP and transmit the processed data to the multiplexing and de-multiplexing unit 1620 or process data transmitted from the multiplexing and de-multiplexing unit 1620 and transmit the processed data to a service application of the higher layer.

The scheduler 1615 allocates transmission resources to the UE at a proper time point in consideration of a buffer status of the UE, a channel status, and active time of the UE, and processes a signal, which the transceiver transmits to the UE, or transmits the signal to the UE.

The controller 1610 may control a general operation of the ENB. The controller 1610 configures the dynamic TDD mode to one or more UEs. When the UE operates in the dynamic time division multiple access (Time Division Duplexer: TDD) mode, the controller 1610 may make a control to transmit a PHR trigger message making a request for transmitting a first PHR for the dynamic subframe and a second PHR for the fixed subframe to the ENB and to receive the PHR corresponding to the PHR trigger message.

Meanwhile, the block diagram illustrating each component by using a block is only for convenience of the description, and the present invention is not limited thereto. For example, it is apparent that the operation performed by each unit may be performed under a control of the controller 1610. Further, it is apparent that the ENB of FIG. 16 may perform the first embodiment and the second embodiment of the present invention. In addition, the controller 1610 may control the operation of the ENB described in FIGS. 1 to 14.

The embodiments disclosed in the present specifications and drawings were provided merely to readily describe and to help a thorough understanding of the present invention but not intended to limit the scope of the present invention. Therefore, it should be construed that, in addition to the embodiments disclosed herein, all modifications and changes or modified and changed forms derived from the technical idea of the present disclosure fall within the scope of the present disclosure.

The invention claimed is:

1. A method performed by a terminal in a wireless communication system, the method comprising:
    receiving a first message including first time division duplex (TDD) configuration information;
    receiving a second message including second TDD configuration information indicating downlink hybrid automatic repeat request (HARQ) reference for dynamic TDD configuration;
    receiving a third message including third TDD configuration information for the dynamic TDD configuration;
    determining a value of a HARQ round trip time (RTT) timer based on the second TDD configuration information included in the second message; and
    monitoring a physical downlink control channel (PDCCH) in downlink subframes determined based on the third TDD configuration information within a duration, when the HARQ RTT timer expires,
    wherein the duration is determined based on the first TDD configuration information and a configured number of subframes.

2. The method of claim 1,
    wherein the value of the HARQ RTT timer is set to k+4, and
    wherein the k is determined according to the downlink HARQ reference.

3. The method of claim 1,
    wherein the first message is a system information block type 1 (SIB 1),
    wherein the second message is a radio resource control (RRC) message, and
    wherein the third message is a layer 1 (L1) signal message.

4. The method of claim 1,
    wherein the configured number of subframes is configured by the second message or a fourth message transmitted from the base station, and
    wherein the second message and the fourth message are a radio resource control (RRC) message.

5. A terminal in a wireless communication system, comprising:
    a transceiver; and
    a controller configured to:
        receive, via the transceiver from a base station, a first message including first time division duplex (TDD) configuration information,
        receive, via the transceiver from the base station, a second message including second TDD configuration information indicating downlink hybrid automatic repeat request (HARQ) reference for dynamic TDD configuration,
        receive, via the transceiver from the base station, a third message including third TDD configuration information for the dynamic TDD configuration,
        determine, a value of a HARQ round trip time (RTT) timer based on the second TDD configuration information included in the second message, and monitor a physical downlink control channel (PDCCH) in downlink subframes determined based on the third TDD configuration information within a duration, when the HARQ RTT timer expires, wherein the duration is determined based on the first TDD configuration information and a configured number of subframes.

6. The terminal of claim 5, wherein the value of the HARQ RTT timer is set to k+4, and wherein the k is determined according to the downlink HARQ reference.

7. The terminal of claim 5, wherein the first message is a system information block type 1 (SIB 1), wherein the second message is a radio resource control (RRC) message, and wherein the third message is a layer 1 (L1) signal message.

8. The terminal of claim 5, wherein the configured number of subframes is configured by the second message or a fourth message transmitted from the base station, and wherein the second message and the fourth message are a radio resource control (RRC) message.

9. A method performed by a base station in a wireless communication system, the method comprising:

transmitting, to a terminal, a first message including first time division duplex (TDD) configuration information;

transmitting, to the terminal, a second message including second TDD configuration information indicating downlink hybrid automatic repeat request (HARQ) reference for dynamic TDD configuration; and transmitting, to the terminal, a third message including third TDD configuration information for the dynamic TDD configuration, wherein a physical downlink control channel (PDCCH) is monitored in downlink subframes determined based on the third TDD configuration information within a duration by the terminal, when a hybrid automatic repeat request (HARQ) round trip time (RTT) timer determined based on the downlink HARQ reference is expired, and wherein the duration is determined by the terminal based on the first TDD configuration information and a configured number of subframes.

10. The method of claim 9, wherein the value of the HARQ RTT timer is set to k+4, and wherein the k is determined according to the downlink HARQ reference.

11. The method of claim 9, wherein the first message is a system information block type 1 (SIB 1), wherein the second message is a radio resource control (RRC) message, and wherein the third message is a layer 1 (L1) signal message.

12. The method of claim 9, wherein the configured number of subframes is configured by the second message or a fourth message transmitted from the base station, and wherein the second message and the fourth message are a radio resource control (RRC) message.

13. A base station in a wireless communication system, comprising:

a transceiver; and a controller configured to:
transmit, via the transceiver to a terminal, a first message including first time division duplex (TDD) configuration information, transmit, via the transceiver to the terminal, a second message including second TDD configuration information indicating downlink hybrid automatic repeat request (HARQ) reference for dynamic TDD configuration, and transmit, via the transceiver to the terminal, a third message including third TDD configuration information for the dynamic TDD configuration, wherein a physical downlink control channel (PDCCH) is monitored in downlink subframes determined based on the third TDD configuration information within a duration by the terminal, when a hybrid automatic repeat request (HARQ) round trip time (RTT) timer determined based on the downlink HARQ reference is expired, and wherein the duration is determined by the terminal based on the first TDD configuration information and a configured number of subframes.

14. The base station of claim 13, wherein the value of the HARQ RTT timer is set to k+4, and wherein the k is determined according to the downlink HARQ reference.

15. The base station of claim 13, wherein the first message is a system information block type 1 (SIB 1), wherein the second message is a radio resource control (RRC) message, and wherein the third message is a layer 1 (L1) signal message.

16. The base station of claim 13, wherein the configured number of subframes is configured by the second message or a fourth message, and wherein the second message and the fourth message are a radio resource control (RRC) message.

* * * * *